(12) United States Patent
Kanazawa et al.

(10) Patent No.: US 7,440,675 B2
(45) Date of Patent: Oct. 21, 2008

(54) AV INFORMATION REPRODUCING SYSTEM AND A REPRODUCING METHOD APPLIED TO THE SAME SYSTEM

(75) Inventors: Koji Kanazawa, Tokyo (JP); Sachiko Yasukawa, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1309 days.

(21) Appl. No.: 10/379,723

(22) Filed: Mar. 6, 2003

(65) Prior Publication Data

US 2003/0152366 A1    Aug. 14, 2003

Related U.S. Application Data

(63) Continuation of application No. 09/200,801, filed on Nov. 27, 1998, now Pat. No. 6,580,870.

(30) Foreign Application Priority Data

| Nov. 28, 1997 | (JP) | ................................. 9-328595 |
| Nov. 28, 1997 | (JP) | ................................. 9-328596 |
| Feb. 4, 1998 | (JP) | ................................. 10-023282 |

(51) Int. Cl.
| H04N 5/91 | (2006.01) |
| H04N 5/93 | (2006.01) |
| H04N 5/00 | (2006.01) |
| H04N 7/00 | (2006.01) |
| H04N 7/173 | (2006.01) |
| G11B 5/86 | (2006.01) |
| G11B 5/02 | (2006.01) |
| G11B 5/09 | (2006.01) |
| G06F 15/16 | (2006.01) |

(52) U.S. Cl. .............................. 386/69; 386/52; 386/70; 386/95; 386/125; 348/473; 360/15; 360/27; 360/39; 709/219; 709/231; 725/110

(58) Field of Classification Search ................... 386/69, 386/52, 70, 95, 125, E5.034; 348/473; 360/15, 360/27, 39; 709/219, 231; 725/110
See application file for complete search history.

(56) References Cited

U.S. PATENT DOCUMENTS 5,032,926 A * 7/1991 Imai et al. ..................... 386/52

(Continued)

FOREIGN PATENT DOCUMENTS

JP           3-9393           1/1991

(Continued)

OTHER PUBLICATIONS

"Decision of Rejection," Japanese Patent Office, for Japanese Patent Application No. 2005-228119, mailed Aug. 28, 2007.

(Continued)

*Primary Examiner*—Thai Tran
*Assistant Examiner*—Syed Y Hasan
(74) *Attorney, Agent, or Firm*—Finnegan, Henderson, Farabow, Garrett & Dunner, L.L.P.

(57) ABSTRACT

In a system for reproducing AV information from a recording medium, such as a DVD, not only are usual titles reproduced, but also related information relevant to specific stream information is acquired easily by making use of resources on a computer network. In a reproducing system with the function of reproducing the title information recorded on a DVD and displaying it on the screen of a display section, when the user clicks a Web mark on the screen, the CPU links to a Web server on the Internet via a modem and accesses the Web page related to the stream information on the screen. At that time, the related Web page is the selected information conforming to parental information, or attribute information, set in the system.

11 Claims, 20 Drawing Sheets

U.S. PATENT DOCUMENTS

| | | | |
|---|---|---|---|
| 5,691,972 | A | 11/1997 | Tsuga et al. |
| 5,745,645 | A | 4/1998 | Nakamura et al. |
| 5,774,664 | A | 6/1998 | Hidary et al. |
| 5,774,666 | A * | 6/1998 | Portuesi ............ 725/110 |
| 5,818,441 | A | 10/1998 | Throckmorton et al. |
| 5,870,523 | A | 2/1999 | Kikuchi et al. |
| 5,907,658 | A * | 5/1999 | Murase et al. ............ 386/95 |
| 5,909,551 | A * | 6/1999 | Tahara et al. ............ 709/231 |
| 5,946,050 | A | 8/1999 | Wolff |
| 5,982,445 | A | 11/1999 | Eyer et al. |
| 5,991,798 | A | 11/1999 | Ozaki et al. |
| 5,999,694 | A | 12/1999 | Yasuda et al. |
| 6,018,764 | A | 1/2000 | Field et al. |
| 6,025,837 | A | 2/2000 | Matthews et al. |
| 6,246,441 | B1 | 6/2001 | Terakado et al. |
| 6,259,858 | B1 | 7/2001 | Ando et al. |
| 6,289,165 | B1 | 9/2001 | Abecassis |

FOREIGN PATENT DOCUMENTS

| | | |
|---|---|---|
| JP | 3-52070 | 6/1991 |
| JP | 4-163589 | 6/1992 |
| JP | 9-81361 | 3/1997 |
| JP | 9-101928 | 4/1997 |
| JP | 9-128408 | 5/1997 |
| JP | 9-247599 | 9/1997 |
| JP | 09-257501 | 10/1997 |
| JP | 09-288677 | 11/1997 |

OTHER PUBLICATIONS

"Notification of Reasons for Rejection" from the Japanese Patent Office, mailed Jun. 14, 2005.

"Decision of Rejection" from the Japanese Patent Office, Oct. 14, 2005.

Katsuyuki Tanaka et al., "Development and Standardization of Interdisk," Hitachi Hyouron, Aug. 1, 1997, vol. 79, No. 8, pp. 67-70.

Koji Sato et al., "Proposition and Realization of Video Browsing Mechanism on WWW," Collected Papers in 14th Convention of Japan Society For Software Science and Technology, Sep. 30, 1997, pp. 193-196.

"Notification of Reasons for Rejection," Japanese Patent Office, Aug. 1, 2006.

Itaya, Yoshio, "Only One Provider for Children in the World," Monthly Windows NT World, Nov. 1, 1997, vol. 2, No. 11, pp. 279-282.

* cited by examiner

40b

| |
|---|
| TOTAL NUMBER OF PIECES OF URL RELATED INFORMATION (n) |
| ST-1: PROGRAM CHAIN NUMBER, VIDEO TITLE NUMBER, CELL NUMBER, CHAPTER NUMBER, INFORMATION NOTICE TIME (2 SEC LATER, FOR 1 SEC), COORDINATE INFORMATION {(sx, sy, ex, ey §1-1), (sx, sy, ex, ey §1-2), (sx, sy, sx, sy §1-3)} §1 |
| ST-2: PROGRAM CHAIN NUMBER, VIDEO TITLE NUMBER, CELL NUMBER, CHAPTER NUMBER, INFORMATION NOTICE TIME (1 SEC LATER, FOR 2 SEC), COORDINATE INFORMATION {(sx, sy, ex, ey §2-1), (sx, sy, ex, ey §2-2)} §2 |
| ⋮ |
| ST-n: PROGRAM CHAIN NUMBER, VIDEO TITLE NUMBER, CELL NUMBER, CHAPTER NUMBER, INFORMATION NOTICE TIME (NONE), COORDINATE INFORMATION {(sx, sy, ex, ey §n)} §n |
| URL DISPLAY RELATED INFORMATION §1-1 |
| URL DISPLAY RELATED INFORMATION §1-2 |
| URL DISPLAY RELATED INFORMATION §1-3 |
| URL DISPLAY RELATED INFORMATION §2-1 |
| URL DISPLAY RELATED INFORMATION §2-1 |
| ⋮ |
| URL DISPLAY RELATED INFORMATION §n |

30 (brace grouping URL DISPLAY RELATED INFORMATION entries)

FIG. 3

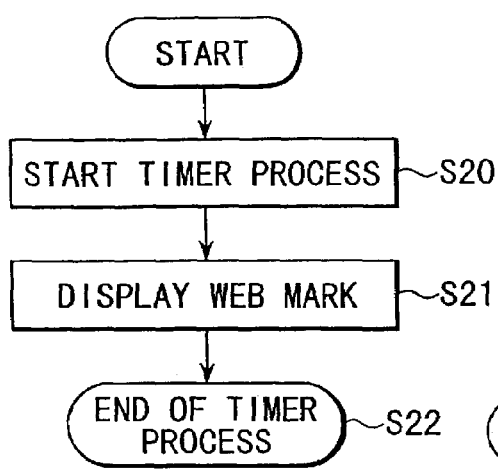
FIG. 6
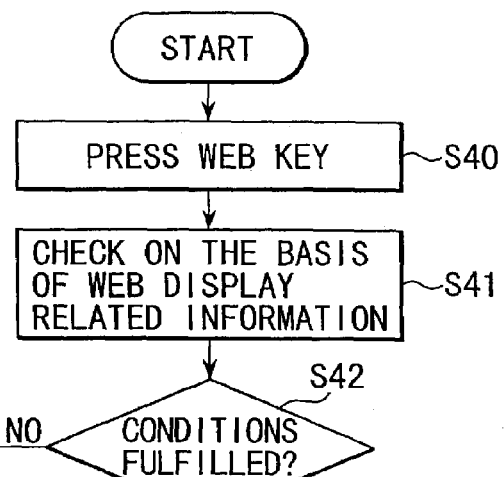
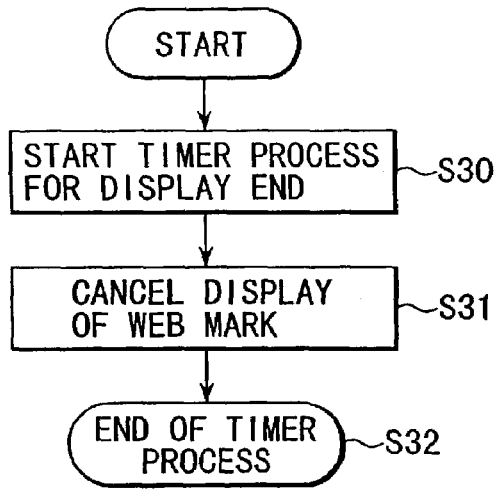
FIG. 7
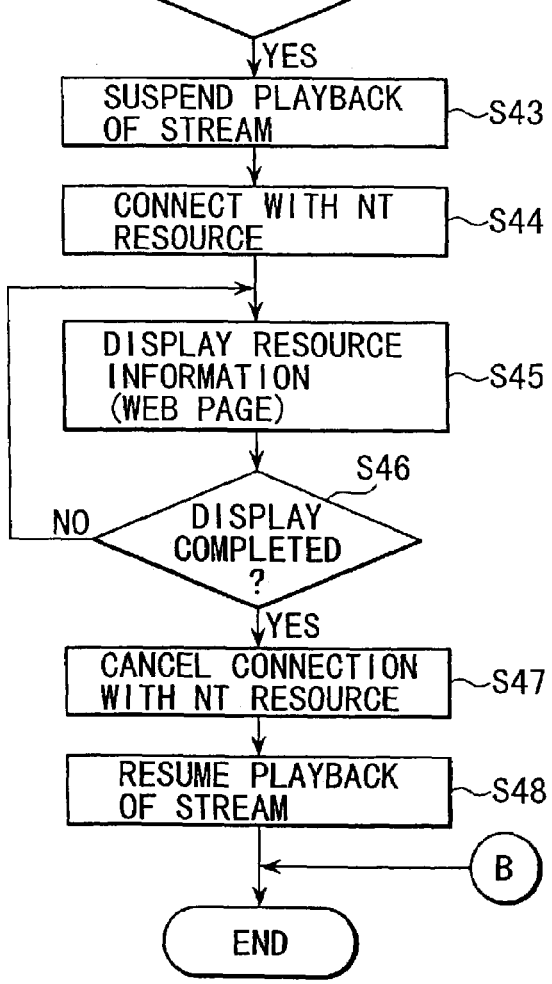
FIG. 8

| TOKYO001 |
|---|
| http://www.tokyo.co.jp/.../tos001.htm |
| TOKYO002 |
| http://www.tokyo.co.jp/.../tos002.htm |
| : |
| TOKYOXXX |
| http://www.tokyo.co.jp/.../tosxxx.htm |

FIG. 22A

| TOKYO001 |
|---|
| If Today>981231 Jump 2 |
| http://www.tokyo.co.jp/.../tos001.htm |
| http://www.tokyo.co.jp/.../tos002.htm |
| TOKYO002 |
| If GPRM0>3 Jump 2 |
| http://www.tokyo.co.jp/.../tos003.htm |
| http://www.tokyo.co.jp/.../tos004.htm |
| : |
| TOKYOXXX |
| http://www.tokyo.co.jp/.../tosxxx.htm |

FIG. 22B

| TOKYO001 |
|---|
| http://www.tokyo.co.jp/.../tos001.htm |
| 3 |
| http://www.tokyo.co.jp/.../tos002.htm |
| http://www.tokyo.co.jp/.../tos003.htm |
| http://www.tokyo.co.jp/.../tos004.htm |
| TOKYO002 |
| http://www.tokyo.co.jp/.../tos005.htm |
| 1 |
| http://www.tokyo.co.jp/.../tos006.htm |
| : |
| TOKYOXXX |
| http://www.tokyo.co.jp/.../tosxxx.htm |
| 0 |

FIG. 22C

PGC CONTENTS

AV INFORMATION REPRODUCING SYSTEM AND A REPRODUCING METHOD APPLIED TO THE SAME SYSTEM

This is a continuation of application Ser. No. 09/200,801, filed Nov. 27, 1998, now U.S. Pat. No. 6,580,870, that claims the benefit of Japanese Application Nos. 9-328595, 9-328596, and 10-023282, filed on Nov. 28, 1997, Nov. 28, 1997, and Feb. 4, 1998, respectively, all of which are incorporated herein by reference.

BACKGROUND OF THE INVENTION

This invention relates to a system for reproducing AV information, and more particularly to a reproducing system having an external access function that acquires related information connected with the reproduced stream information from resources on a computer network.

With the recent development of large-capacity DVDs (digital video disks), various reproducing systems for making use of multimedia information, including digital video information (including still pictures) and digital audio information, have been proposed. Hereinafter, digital video information (including still pictures) and digital audio information are generally called AV information.

For example, the reproducing system is an apparatus that has a DVD drive and corresponds a video player or a video deck with the function of reproducing the AV information recorded on a DVD set in the DVD drive and displaying the reproduced information on a television set or the display (or screen) of a personal computer.

The AV information encoded by a moving-picture coding scheme known as the MPEG (moving picture coding experts group) 2 is generally multiplexed with audio information and the multiplexed information is recorded on a DVD. From the DVD, the reproducing system reproduces stream information in specific coding streams (or consecutive bit data strings) corresponding to the specified title (for example, movie), thereby reproducing the AV information on the screen consecutively.

With the recent development of computers and multimedia technology, various multimedia-compatible computer systems have been developed. This type of computer system is provided with the function of reproducing moving pictures and audio data as well as text data and graphics data.

As multimedia computers have been used widely, DVDs have lately attracted attention as a new storage medium to replace the CD-ROM. One side of a single DVD-ROM medium can store about 4.7 Gbyte of data, about seven times the present CD-ROM. Therefore, about 9.4 Gbyte of data can be stored on both sides of the DVD-ROM medium. Use of the DVD-ROM medium enables moving pictures, including movies containing a large volume of video information, to be reproduced with a high quality.

Recently, there has been a great demand for highly sophisticated and profitable information handling, by imparting the interactiveness or responsiveness to digital data of, for example, moving pictures, used in the above-described reproduction system or computer system.

BRIEF SUMMARY OF THE INVENTION

An object of the present invention is to provide a reproducing system which reproduces AV information from a storage medium, such as a DVD, and which is capable of not only reproducing normal titles but also easily acquiring related information connected with specific stream information from resources on a computer network.

Another object of the present invention is to provide a reproducing system capable of acquiring the optimum related information that meets specific conditions, including the attributes of the system, when the related information is acquired from resources on a computer network.

Still another object of the present invention is to provide a system which enables DVD video titles to be combined with the Internet by an effective use and simple expansion of the DVD standard without changing the standard and which realizes a new service where DVD video titles are combined with hypermedia contents, such as HTML files, provided on the Internet.

According to the present invention, there is provided a reproducing apparatus comprising: acquiring means for acquiring stream data received from a medium and access information associated with the stream data; reproducing means for reproducing the acquired stream data; input means for accepting an instruction from a user; referring means for referring to an external information corresponding to the stream data acquired at a point when an input is accepted, on the basis of the access information associated with the stream data, in the case where there is such an input from the input means during the reproduction of the stream data; and outputting means for outputting the external information referred by the referring means.

According to the apparatus, the user may get not only information reproduced from the stream data recorded in the medium such as a DVD but also external information output by the outputting means.

Additional objects and advantages of the invention will be set forth in the description which follows, and in part will be obvious from the description,-or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 conceptually shows the structure of an information management table;

FIG. 6 is a flowchart to help explain the operation of the reproducing system of the first embodiment;

FIG. 7 is a flowchart to help explain the operation of the reproducing system of the first embodiment;

FIG. 8 is a flowchart to help explain the operation of the reproducing system of the first embodiment;

FIG. 22A shows an example of a management table that correlates IDs with URLs used in the image display apparatus of the third embodiment;

FIG. 22B shows an example of a management table that correlates IDs with URLs used in the image display apparatus of the third embodiment;

FIG. 22C shows an example of a management table that correlates IDs with URLs used in the image display apparatus of the third embodiment;

DETAILED DESCRIPTION OF THE INVENTION

Hereinafter, referring to the accompanying drawings, embodiments of the present invention will be explained.

First Embodiment

Figure 1:
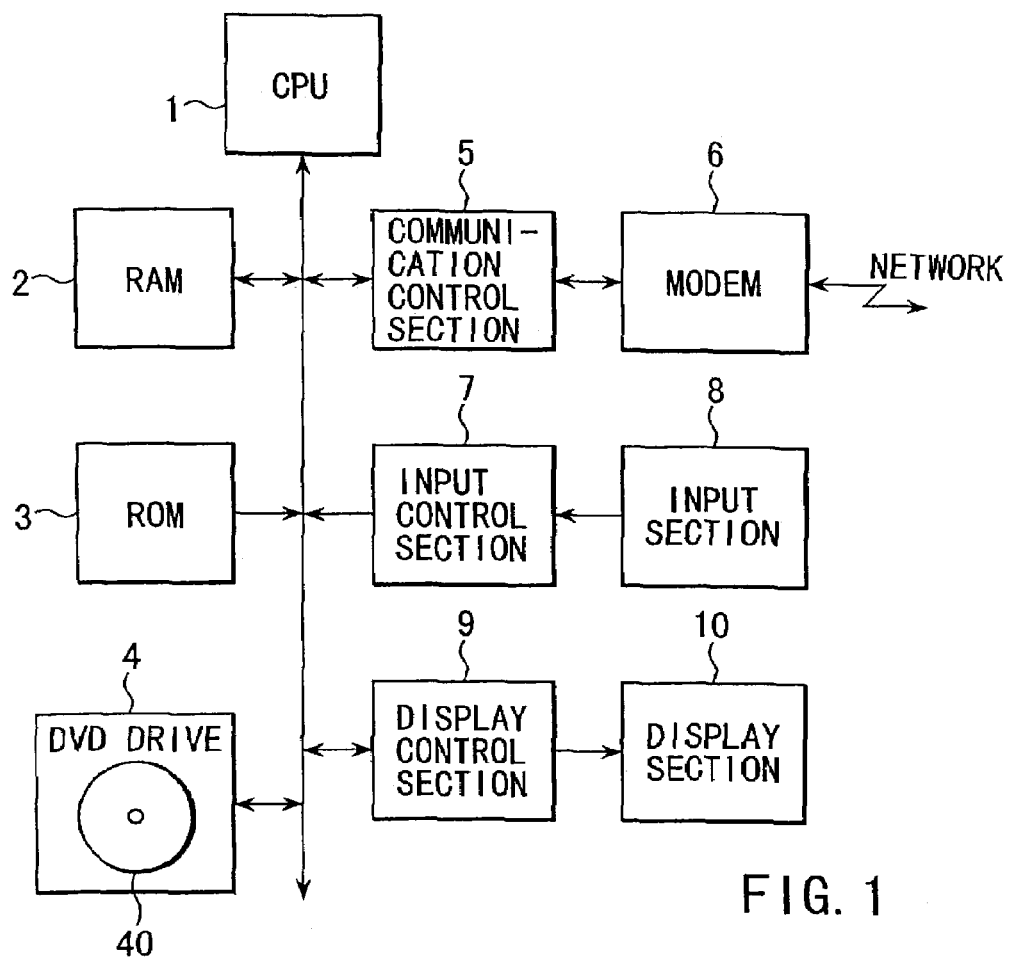
FIG. 1 is a block diagram of the hardware of a reproducing system according to a first embodiment of the present invention.
Figure 2:
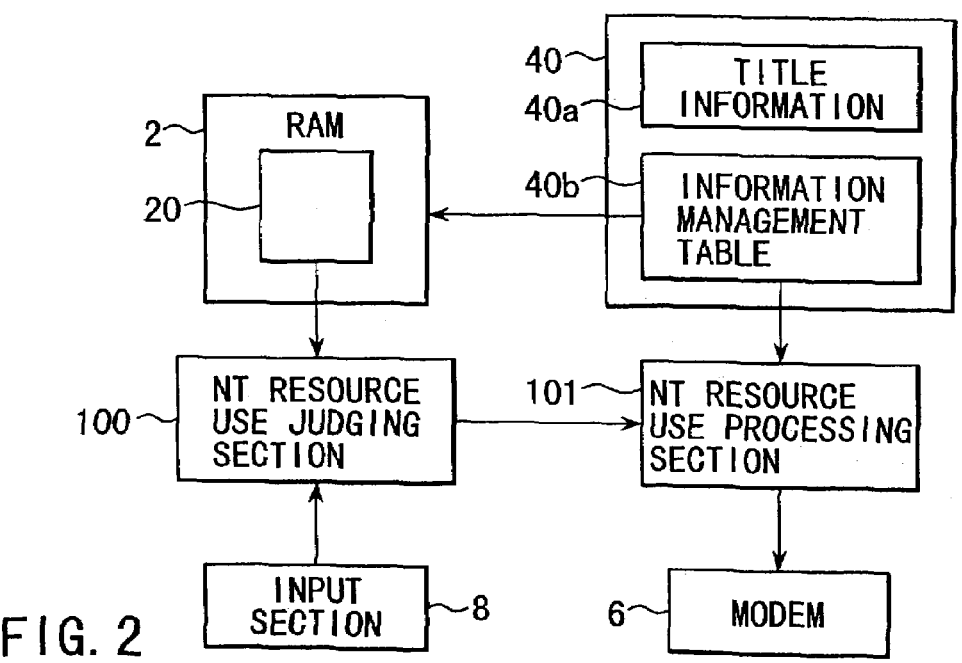
FIG. 2 is a block diagram of a conceptual configuration of the reproducing system according to the first embodiment of the present invention.

FIG. 1 is a block diagram of the hardware configuration of a reproducing system according to a first embodiment of the present invention. FIG. 2 is a block diagram of a conceptual configuration of the reproducing system.

(System Configuration)

The reproducing system of the first embodiment is assumed to be a personal computer containing a DVD drive.

As shown in FIG. 1, the hardware configuration of the reproducing system comprises a microprocessor (CPU) 1 constituting a main control unit, a RAM 2, functioning as a work memory (main memory) for the CPU 1, a ROM 3 in which programs for the CPU 1 and the like are stored, and a DVD drive 4. The DVD drive 4 is a storage medium related to the first embodiment and is a drive for driving a DVD 40 in which AV information and an information management table (resource use information) are stored.

The system further comprises a network connection unit that has a communication control section 5 and modem 6 for connecting to Web servers acting as resources on the Internet, an input unit composed of an input control section 7 and an input section 8, and a display unit composed of a display control section 9 and a display section 10. The input section 8 has a mouse and a keyboard. The display section 10 is, for example, a CRT display, a liquid-crystal display, or a TV display.

(Conceptual Configuration Related to Playback Operation)

On the DVD 40 in the DVD drive 4 of the first embodiment, AV information (hereinafter, referred to as title information) 40a and an information management table 40b are stored as shown in FIG. 2. The title information 40a is, for example, multimedia information, such as movies, and is coded stream (consecutive bit data string) information encoded by, for example, the MPEG-2 moving picture coding scheme. The title information 40a generally includes control information conforming to, for example, the DVD standard (i.e., management information such as navigation commands related to data playback control) as well as the stream information.

The information management table 40b is resource use information for using resources (assumed to be Web servers) on a network (assumed to be the Internet). Specifically, as shown in FIG. 3, the information management table 40b is composed of pieces of identification information (area information on DVD 40) ST-1 to ST-n for identifying individual streams in the title information 40a and access information (or link information) 30.

The pieces of identification information. ST-1 to ST-n include not only information to identify a stream on the basis of the DVD standard, including a program chain number (a logic unit for reproducing all or part of a title), a video title number, a cell number, and a chapter number, but also information on information notice time (hereinafter, referred to as time information) related to the first embodiment and coordinate information. The time information is used for display control (the start and end of display) of a Web mark (specific input information) indicating that resources are available in a specific piece of the stream information (scene) in the stream (in the first embodiment, Web page, can be displayed), as explained later. When Web pages can be displayed for all of the stream (or when Web pages can be accessed for all of the stream), the time information is unnecessary.

Figure 10A:
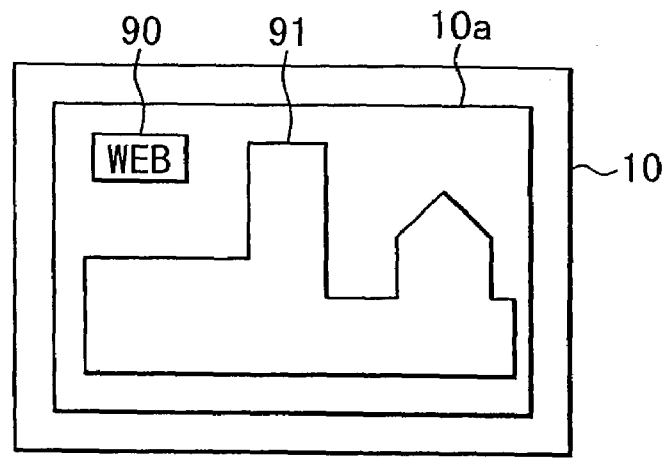
FIG. 10A conceptually shows an example of a display screen of the reproducing system according to the second embodiment.
Figure 10B:
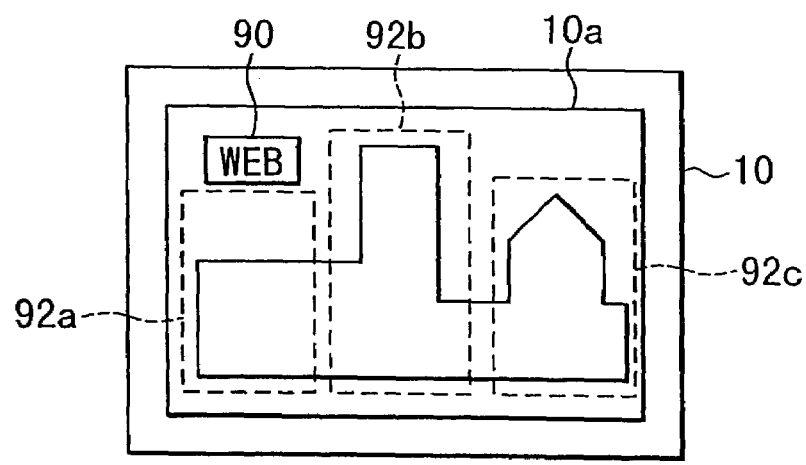
FIG. 10B conceptually shows an example of a display screen of the reproducing system according to the second embodiment.
Figure 10C:
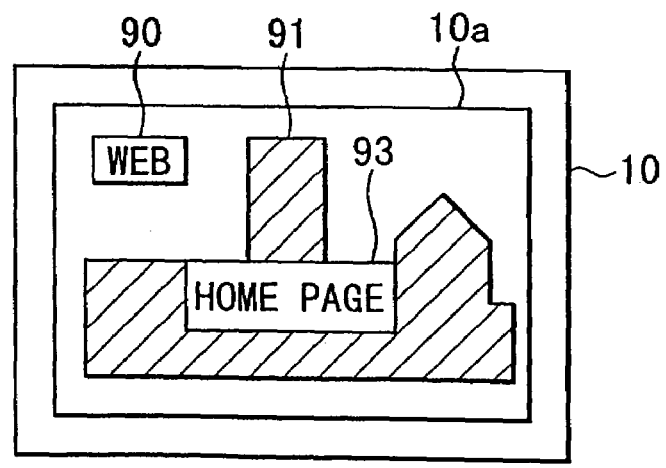
FIG. 10C conceptually shows an example of a display screen of the reproducing system according to the second embodiment.

The coordinate information is used when Web pages can be accessed for each set of pieces of section information in a specific piece of stream information (moving picture) in the stream. Therefore, when the number of Web pages to be accessed is one in the specific pieces of stream information, the coordinate information is unnecessary. Specifically, as shown in FIG. 10B, when the stream information displayed on the screen 10a of the display section 10 is treated as pieces of section information 92a to 92c, a Web page is prepared for each of the pieces of section information 92a to 92c. The pieces of section information 92a to 92c are identified on the basis of the coordinate information.

The access information (link information) 30 is information (URL display related information) to connect to resources (Web servers) for accessing a Web page corresponding to a specific piece of stream information in the individual streams (ST-1 to ST-n) or to the entire stream. For example, the system is connected to a Web server corresponding to the access information (§n) and a Web page corresponding to stream ST-n is accessed.

Figure 4:
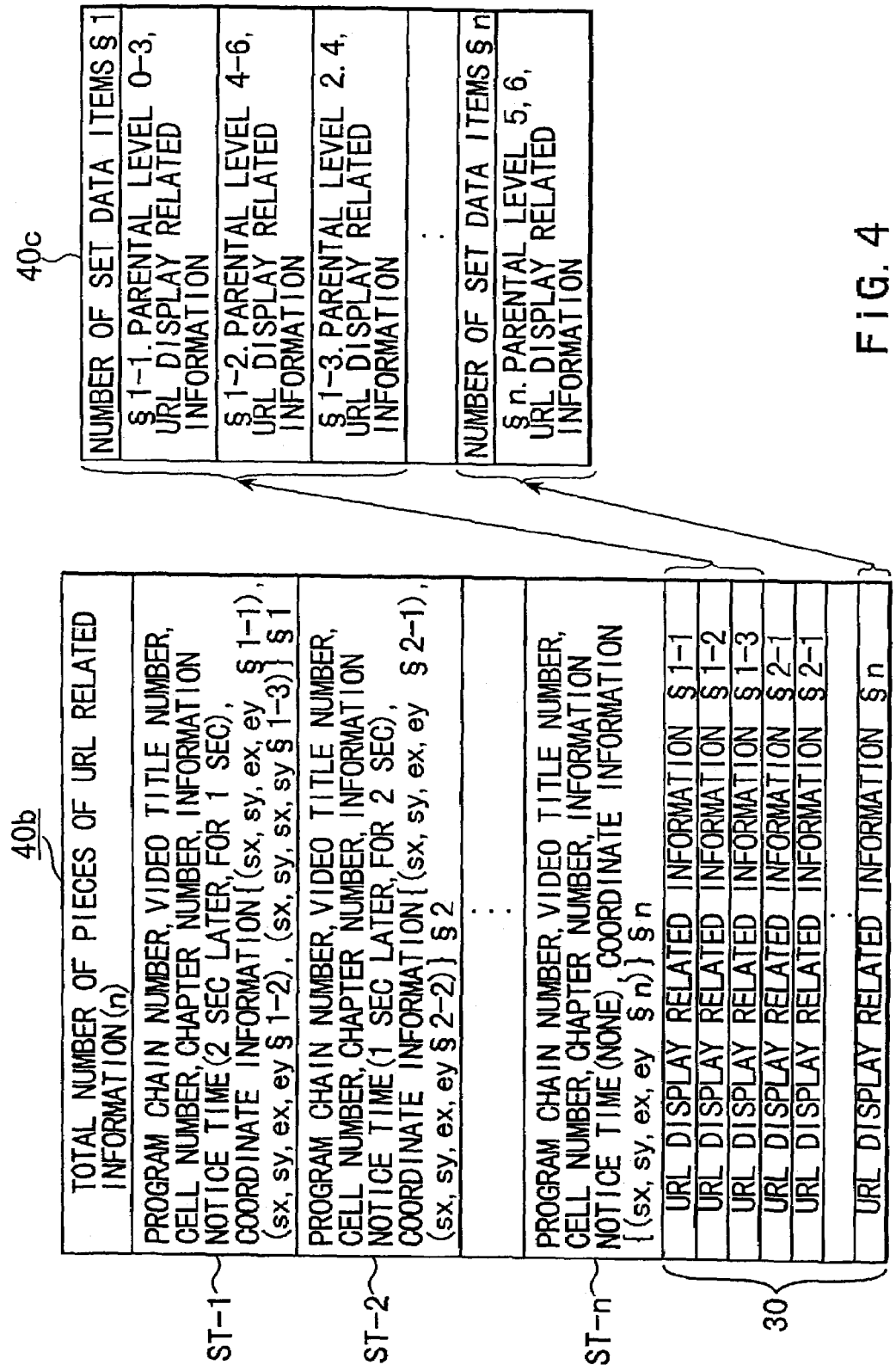
FIG. 4 conceptually shows the structure of an information management table having an attached table.
Figure 5:
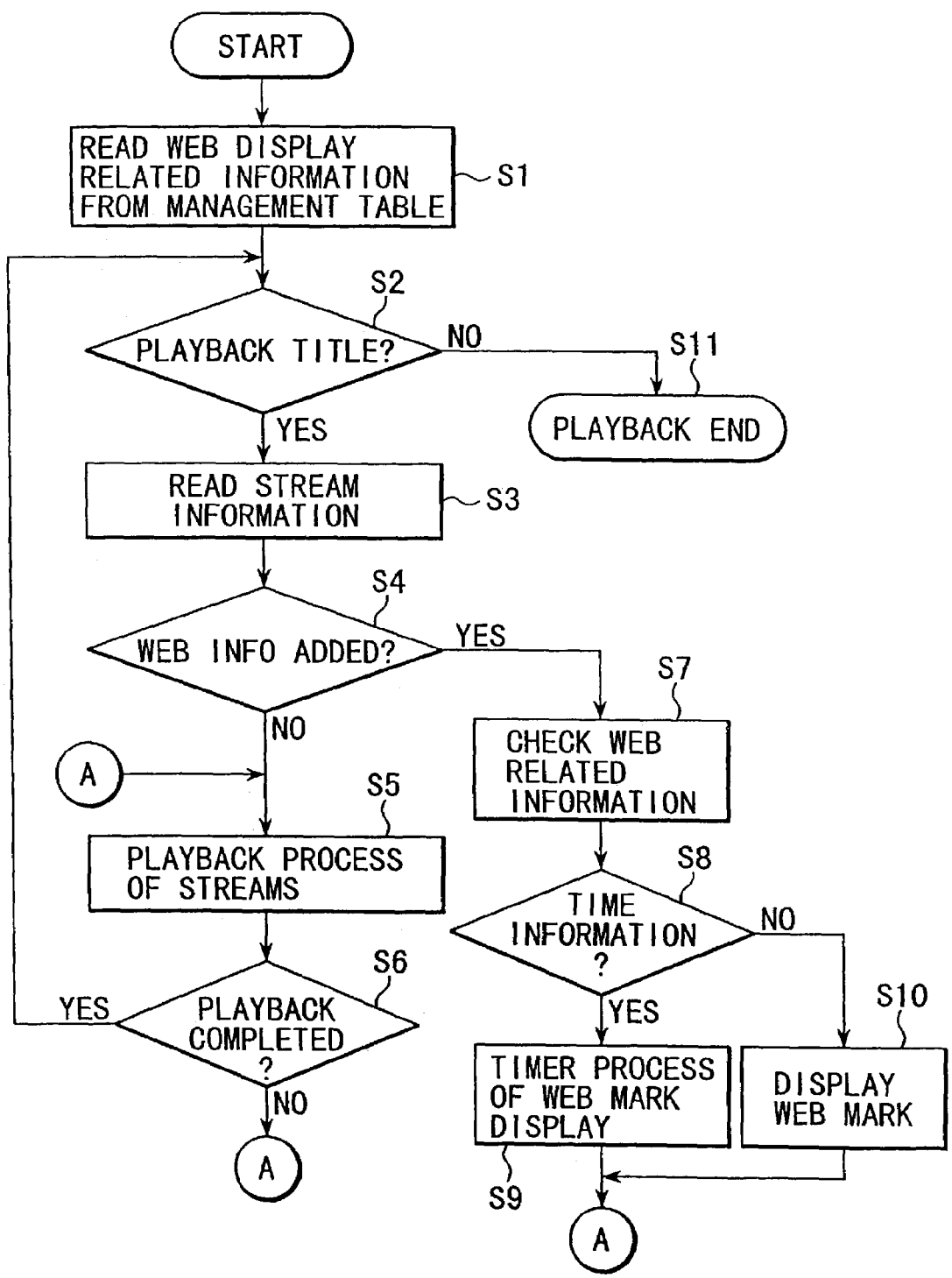
FIG. 5 is a flowchart to help explain the operation of the reproducing system of the first embodiment.

Furthermore, as shown in FIG. 4, the access information 30 is defined on the basis of parental information related to a parental function in system attribute information set in the reproducing system. Specifically, the information management table 40b has an attached table 40c for defining the access information 30 on the basis of the parental information and is designed to select link information (URL display related information) on the basis of the parental information and connect the system to the optimum Web server.

The parental function is based on a playback control (or playback limit) method applied to a digital image information reproducing system. Parental levels are defined as parental information related to the parental function. For the parental levels, for example, eight levels are set, ranging from the maximum limit level (level 8) to the minimum limit level (level 1). The contents to be reproduced in the reproducing system are limited on the basis of the set parental levels. Specifically, for example, when the maximum limit level 8 is set for "Adult" level, the digital image information means adult movies. Moreover, for example, when the minimum limit level 1 is set for "Child" level, the digital image information means images intended for children. Therefore, with the reproducing system, when the parental level set by the parental information is, for example, level 7 or lower, the digital image information for adult movies with parental level 8 is inhibited from being reproduced.

The information management table 40b is read, as shown in FIG. 2, from the DVD 40 under the control of the CPU 1 in reproducing the title information and is stored in a specific area 20 of the RAM 2. Using the information management table 40b stored in the RAM 2, the CPU 1 executes the resource use process. Specifically, according to the user's specify operation (or the clicking of a Web mark by the user), an NT (network) resource use judging section 100 judges whether the resource use is valid (i.e., judges whether Web page accessing can be done). On the basis of the result of the judgment by the judging section 100, an NT resource use processing section 101 connects to the relevant Web server on the network and accesses the Web page corresponding to the related information. The judging section 100 and NT resource use processing 101 each represent conceptual component parts composed of the CPU 1 and set programs.

(Title Reproducing Process)

Hereinafter, the operation of the first embodiment will be explained by reference to flowcharts in FIGS. 5 to 9 and conceptual diagrams related to display screens in FIGS. 10 to 13 as well as FIGS. 1 to 4.

First, when a DVD 40 has been set in the DVD drive 4 and the user has entered an instruction to reproduce title information from the input section 8, the CPU 1 starts the playback process of reading the title information from the DVD 40 and displaying it on the screen of the display section 10 (or starts a playback program).

At the beginning of the playback, the CPU 1 reads the information management table 40b (including the attached table 40c) from the DVD 40 and loads it into the main memory (RAM) 2 (step S1). This enables the CPU 1 to read resource use information (also sometimes called WEB display related information) to access the related information (or Web page) relevant to each stream in the title information to be reproduced.

When having confirmed that the title information specified by the DVD 40 is present, the CPU 1 reads the stream information in stream units (steps S2, S3). On the basis of the information management table 40b, the CPU 1 checks each stream unit to see if the WEB display related information has been added (step S4). Specifically, if the information management table 40b has included no WEB display related information, the CPU 1 continues a normal playback process without executing the resource use process (NO at step S4, and steps S5, S6, and S11).

When the WEB display related information has been included in the information management table 40b as shown in FIG. 3, the CPU 1 checks the contents of the WEB display related information to see if the time information is present (steps S7 and S8). If there is no time information, the CPU 11 will display a Web mark (also sometimes written as a WEB mark) on the screen of the display section 10 in reproducing the entire stream (NO at step S8 and step S10). This corresponds to a case where the stream information corresponding to stream ST-n is reproduced as shown in FIG. 3. Specifically, as shown in FIG. 10A, when a specific piece of stream information 91 has been displayed on the screen 10a of the display section 10, a Web mark 90 is displayed on the screen 10a. If the time information is present, the CPU 1 will execute a timer process for Web mark display control (YES at step S8 and step S9).

(Web Mark Display Process)

Figure 12:
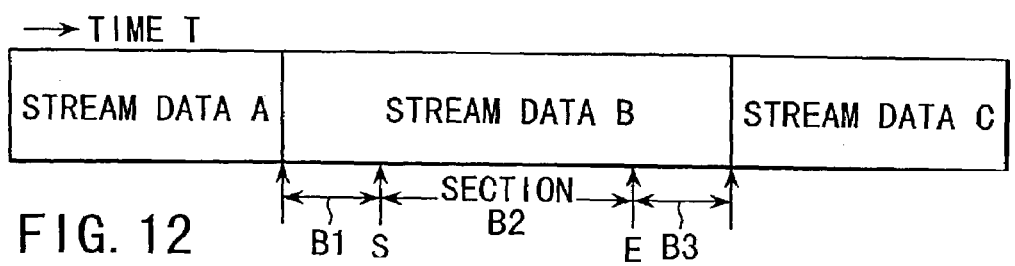
FIG. 12 conceptually shows the relationship between stream data and specific stream information used in the reproducing system of the second embodiment.

The timer process on the basis of the time information will be described by reference to the flowcharts of FIGS. 6 and 7 and to FIG. 12.

The time information is information to specify the display time for displaying a Web mark during a display period of a specific piece of stream information (corresponding to a scene enabling resource use, for example, ST-1 in FIG. 3) for which a Web page has been prepared. It is assumed that stream data items A to C being reproduced consecutively as shown in FIG. 12. The specific piece of stream information corresponds to a scene corresponding to section B2 of stream data B. It is set as information to display a Web mark on the basis of the time information. The CPU 1 starts the timer at the reproduce start (at time S) of section B2 and displays a Web mark on the screen of the display section 10 (steps S20, S31). After the reproduction of section B2 has been completed (at time E), control proceeds to a display process for canceling the display of the Web mark (steps S30, S31).

Figures 13A, 13B, 13C:
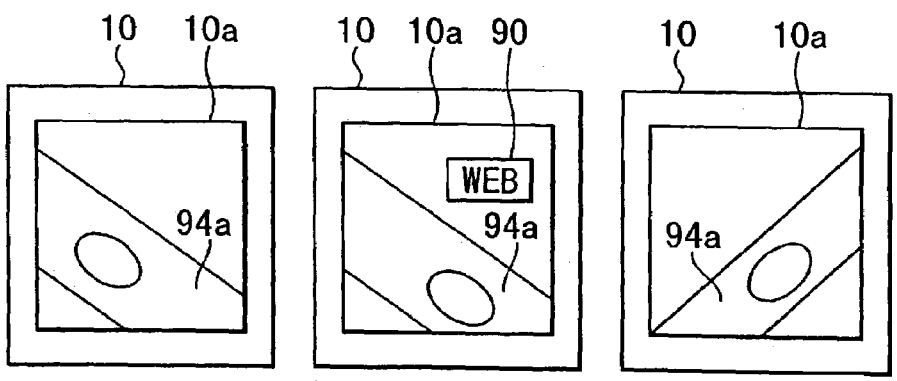
FIG. 13A conceptually shows an example of a display screen of the reproducing system according to the second embodiment.
FIG. 13B conceptually shows an example of a display screen of the reproducing system according to the second embodiment.
FIG. 13C conceptually shows an example of a display screen of the reproducing system according to the second embodiment.

The timer process on the basis of the time information executes a display process as shown in FIG. 13. Specifically, as shown in FIG. 13A, stream information 94a in the preceding section A is displayed on the screen 10a of the display section 10. Following this, stream information 94b in section B is displayed on the screen 10a as shown in FIG. 13B. At this time, by the timer process, the Web mark 90 is displayed on the screen 10a. Thereafter, stream information 94c in section C is displayed on the screen 10a as shown in FIG. 13C. By the Web mark display process, the user can check the display of the Web mark 90 on the screen 10a of the display section 10 while stream information 94b in section B is being reproduced. The display of the Web mark 90 suggests that the related information (Web page) relevant to the reproduced stream information 94b should be present and able to be referred to as the need arises.

(Resource Use Process)

Figure 14:
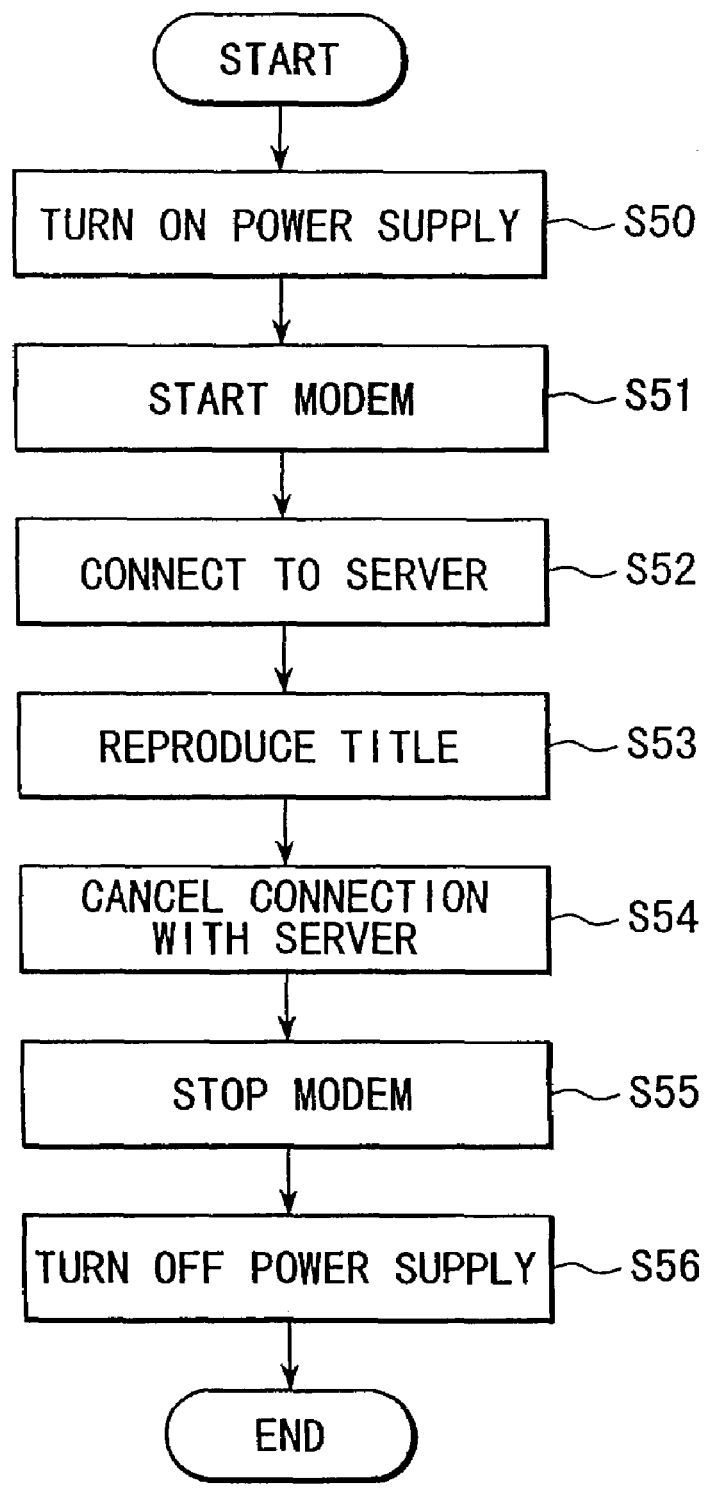
FIG. 14 is a flowchart to help explain the operation of the reproducing system according to the second embodiment.

Hereinafter, the resource use process of the first embodiment will be described by reference to flowcharts in FIGS. 8 and 14 and to FIG. 11.

The basic resource use process without using the attached table 40c of FIG. 4 will be described by reference to the flowchart of FIG. 8.

Figures 11A, 11B:
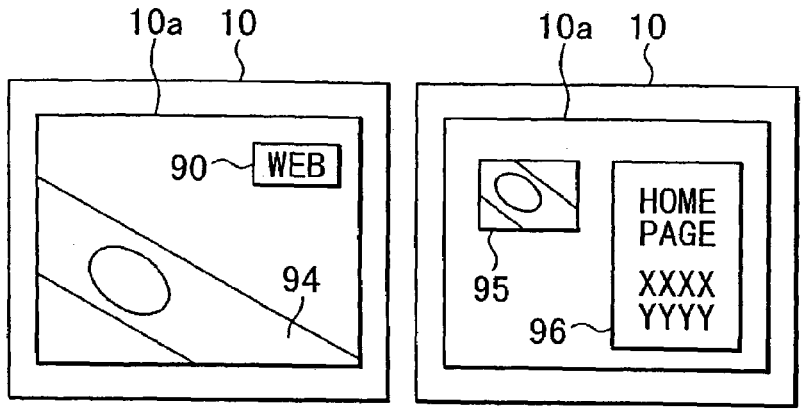
FIG. 11A conceptually shows an example of a display screen of the reproducing system according to the second embodiment.
FIG. 11B conceptually shows an example of a display screen of the reproducing system according to the second embodiment.

It is assumed that stream information:(or scene) 94 is being reproduced on the screen 10a of the display section 10 as shown in FIG. 11A. The scene 94 is, for example, the image where a car is running on a road. When the user clicks the Web mark 90 on the screen 10a with the mouse in the input section 8, the judging section 100 starts as shown in FIG. 2 (step S40). Specifically, the judging section 100 judges the validity of resource use on the basis of the information management table 40b, that is, judges whether the Web page corresponding to the stream information 94 specified by the user can be accessed (step S41).

When the judging process has shown that specific conditions have been fulfilled, the NT resource use process section 101 starts to execute the resource use process (YES at step S42). The specific conditions for validity include the presence of the WEB display related information, the state where the title is being reproduced, and the presence of the access information 30 corresponding to the stream information 94 specified by the user as the WEB display related information. The CPU 1 suspends the process of reproducing the present title information (step S43). The stream information presently being reproduced may be displayed on a window 95 on the screen 10a as shown in FIG. 11B.

The CPU 1 connects to the Internet via the communication control section 5 and modem 6 and accesses the specified Web server on the basis of the access information 30 (step S44). As shown in the flowchart of FIG. 14, after the reproduction of the title information has been suspended, the modem is started and the CPU 1 is connected to the Web-server (step S50 to S52). When the resource use process has been completed as described later, the reproduction-of the title information is resumed and the CPU 1 is disconnected from the Web server, which completes the connection with the network (steps S53 to S56).

When the CPU 1 has accessed the relevant Web server, it receives the Web page (in this case, a home page concerning cars for the stream information 94) related to the stream information 94 prepared in the Web server. Then, as shown in FIG. 11B, the home page 96 is displayed on the screen 10a of the display section 10 (step S45). After the home page 96 has been displayed, the CPU 1 cancels the connection with the NT resource (or Web server) and resumes the reproduction of the title information (YES at step S46 and steps S47, S48). The display of the stream information 91 presently being reproduced may be canceled and the home page be displayed on the window 93 on the screen 10a.

As described above, with the first embodiment, while a title is being reproduced on the screen, when the user wants to refer to the related information in reproducing specific stream information (in displaying a Web mark), he or she has only to perform a specifying operation, such as clicking a Web mark, to display the Web page corresponding to the related information. Therefore, for example, while a running car is displayed on the screen, when the user wants to refer to the related information concerning the car, he or she can refer to the related information concerning cars immediately. In this case, displaying a specific Web mark on the screen enables the user to determine whether the related information can be got by linking with the NT resource.

(Alternative Configuration of the First Embodiment)

The present invention can be applied not only to a reproduction system mainly DVD as described above, but also to some other systems. More specifically, the first embodiment is described in connection with the case where external information is acquired on the basis of the information management table 40b in the reproduction of the title information (encoded stream) 40a stored in the DVD 40. However, the present invention can be applied to a reproduction system designed mainly for TV broadcasting or CATV (such a system is also called "set top box" IRD (integrated receiver decoder)), which can acquire stream data corresponding to the title information 40a. Further, in such a reproduction system, it is possible to employ a configuration in which the information management table 40b is acquired separately from stream data. Alternatively, it is possible that the information management table 40b is acquired from a medium (for example, smart media) which is different from the stream data.

It should be noted that in the above alternative embodiment, the title information 40a is supposed to indicate image information; however it is not limited to the image information. For example, access information is associated to the stream data of sound information, and Web can be referred to on the basis of the information, so as to output the information on a tune, artist and the like, as external information.

Second Embodiment

Hereinafter, a second embodiment of the present invention will be explained.

Figure 9:
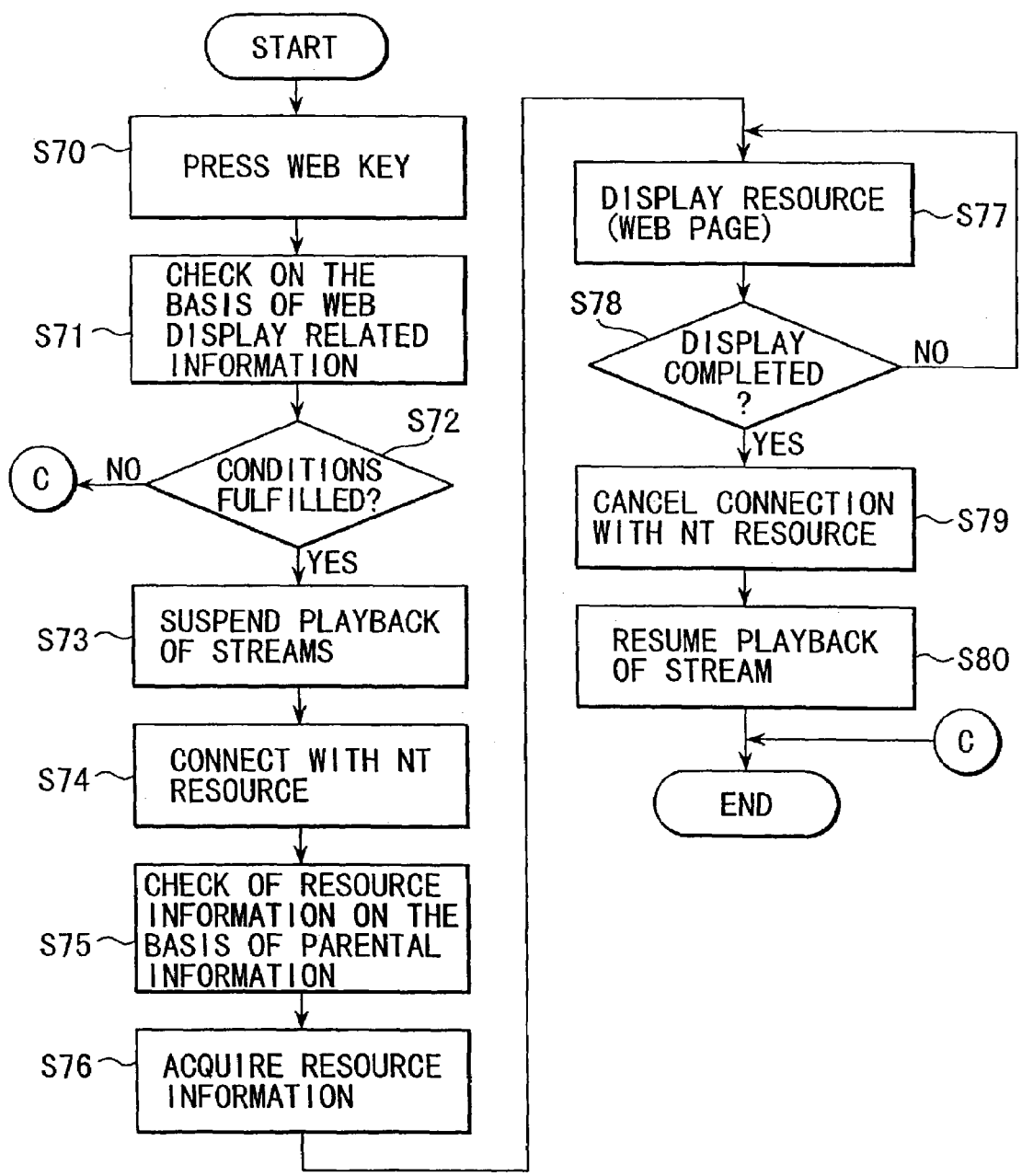
FIG. 9 is a flowchart to help explain the operation of a reproducing system according to a second embodiment of the present invention.

FIG. 9 is a flowchart for the operation of the second embodiment of the invention. The operation is related to a resource use process using the-attached table 40c shown in FIG. 4.

The processes at step S70 to step S74 are the same as those at step S40 to step S44 in the flowchart of FIG. 8 in the first embodiment. After the series of processes, the CPU 1 refers to the attached table 40c of FIG. 4 and checks on the basis of parental information (or parental level) to see if more than one piece of WEB display related information (or link information) is present (step S75). The CPU 1 checks the parental level set in the system on the basis of the preset parental information and selects WEB display related information that coincides with the parental level. The CPU 1 accesses the relevant Web server and receives the Web page (in this case, a home page that coincides with, for example, parental levels 0 to 3), the related information prepared in the Web server (step S76). The processes at step S77 to step S80 are the same as those at step S45 to step S48 of the flowchart of FIG. 8.

On the basis of the parental information included in the attribute information on the system set in the system, the related information that coincides with the parental level can be acquired from network resources and referred to on the playback screen. Therefore, for example, when the related information that coincides with the parental level set in the system is not present, it will not be reproduced on the screen. In other words, when the parental level of the related information is, for example, the adult-oriented maximum level "8," if the parental level set in the reproducing system is "7" or lower, the related information will not be reproduced even if the user requests. This prevents the related information irreverent to the attributes of the system (in this case, the related information that does not coincide with the parental level) from being accessed and enables the related information conforming with the attributes of the system to be always acquired.

(Modification)

Figure 15:
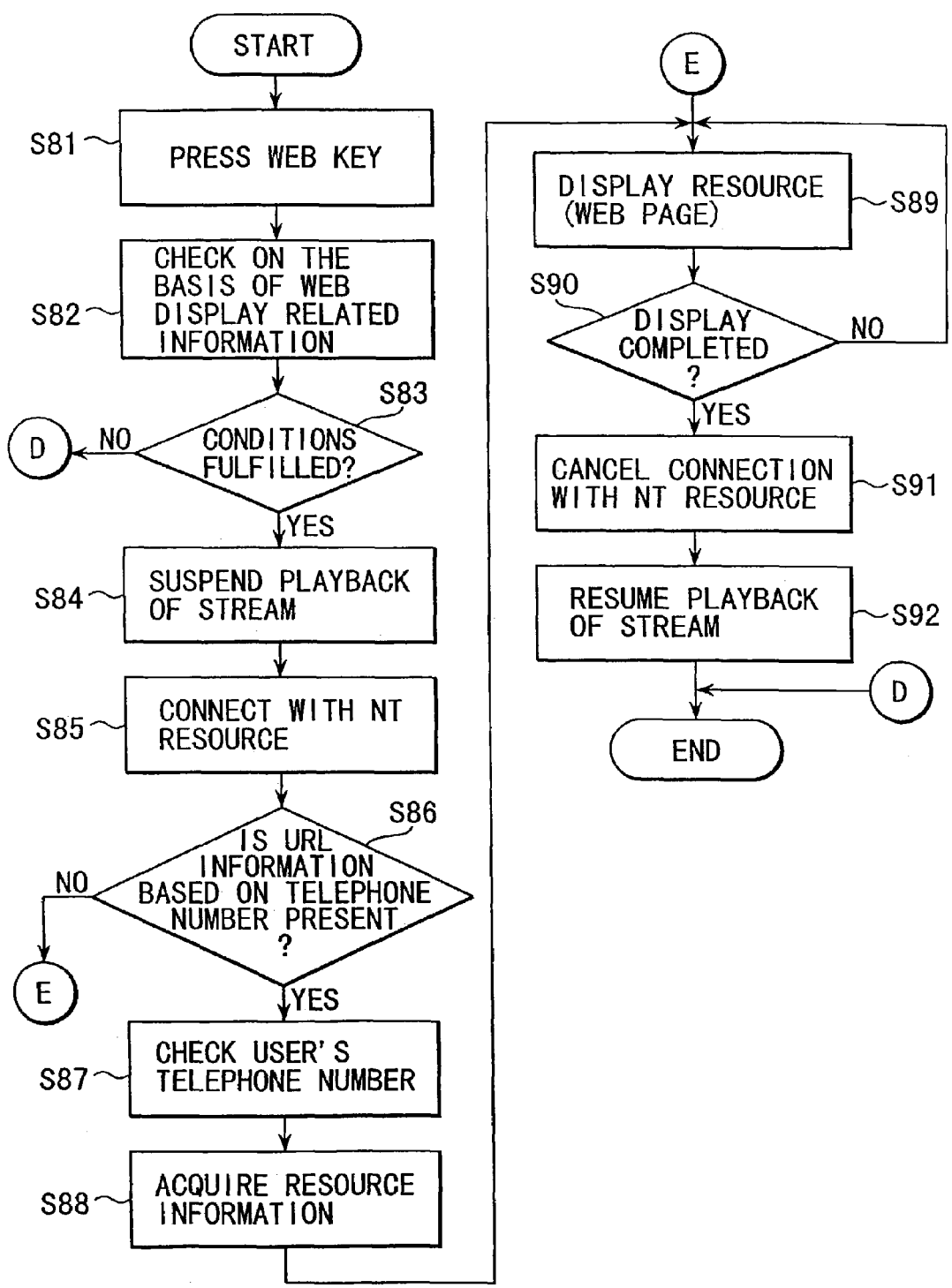
FIG. 15 is a flowchart to help explain the operation of a modification of the reproducing system according to the second embodiment.

FIG. 15 is a flowchart related to a modification of the above-described reproducing system. While in the above embodiment, the parental information is used as the attributes of the system, information on the user's telephone number is used as the attribute information in the modification.

As shown in the flowchart of FIG. 15, after the process at step S85, the CPU 1 checks on the basis of the telephone number information set in the attached table to see if more than one piece of WEB display related information (or link information) is present (step S86). The processes at step S81 to step S85 are the same as those at step S70 to step S74 in the flowchart of FIG. 9. The telephone number information is set in the attached table of FIG. 4 in place of the parental information (or parental level).

The CPU 1 further checks the user-specified telephone number information set in the system and selects the WEB display related information that coincides with the telephone number (step S87). The CPU 1 accesses the relevant Web server and acquires the Web page (in this case, the home page from the Web server that coincides with the user-specified telephone number), the related information prepared in the Web server (step S88). The processes at step S89 to step S92 are the same as those at step S77 to step S80 in the flowchart of FIG. 9.

As described above, with the modification, on the basis of the user-specified telephone number information as the attributes of the system, the related information is acquired from the network resource (that is, the server in the area set by the telephone number) that coincides with the telephone number and is referred to on the screen. Therefore, for example, when the user-requested related information is not present in the servers in the user-specified telephone number area, a server present in another remote area is prevented from being accessed unconditionally. This enables the user to acquire the related information within a reasonable communication charge range.

In addition to the parental information of the embodiment and the telephone number information of the modification, the present invention may be applied to limited access information used as the attribute information about the system. The limited access information is used to limit the accessing time or period.

In the embodiment, the AV information reproducing process and the resource use process are realized by the CPU 1 executing the programs for those processes. The programs have been stored in the DVD 40 or another external storage medium and are loaded into the RAM 2. While in the embodiment, the method of accessing the related information relevant to the video information in the AV information in NT sources has been explained, the present invention may be applied to related information relevant to audio information. For example, when the user wants to know the title of the music played in the background of a scene, he or she enters the data to access the related information relevant to the music in NT resources.

As described in detail, with the first and second embodiments, not only are normal titles reproduced, but also the related information relevant to specific pieces of stream information can be acquired easily by simple operation, making use of resources on a computer network.

Furthermore, for example, on the basis of the attribute information set in the system, such as parental information, only the related information conforming with the attributes of the system can be acquired. This enables the user to quickly acquire the best related information in reproducing normal titles. As a result, various types of information can be reproduced.

Third Embodiment

Hereinafter, a third embodiment of the present invention will be explained.

Figure 16:
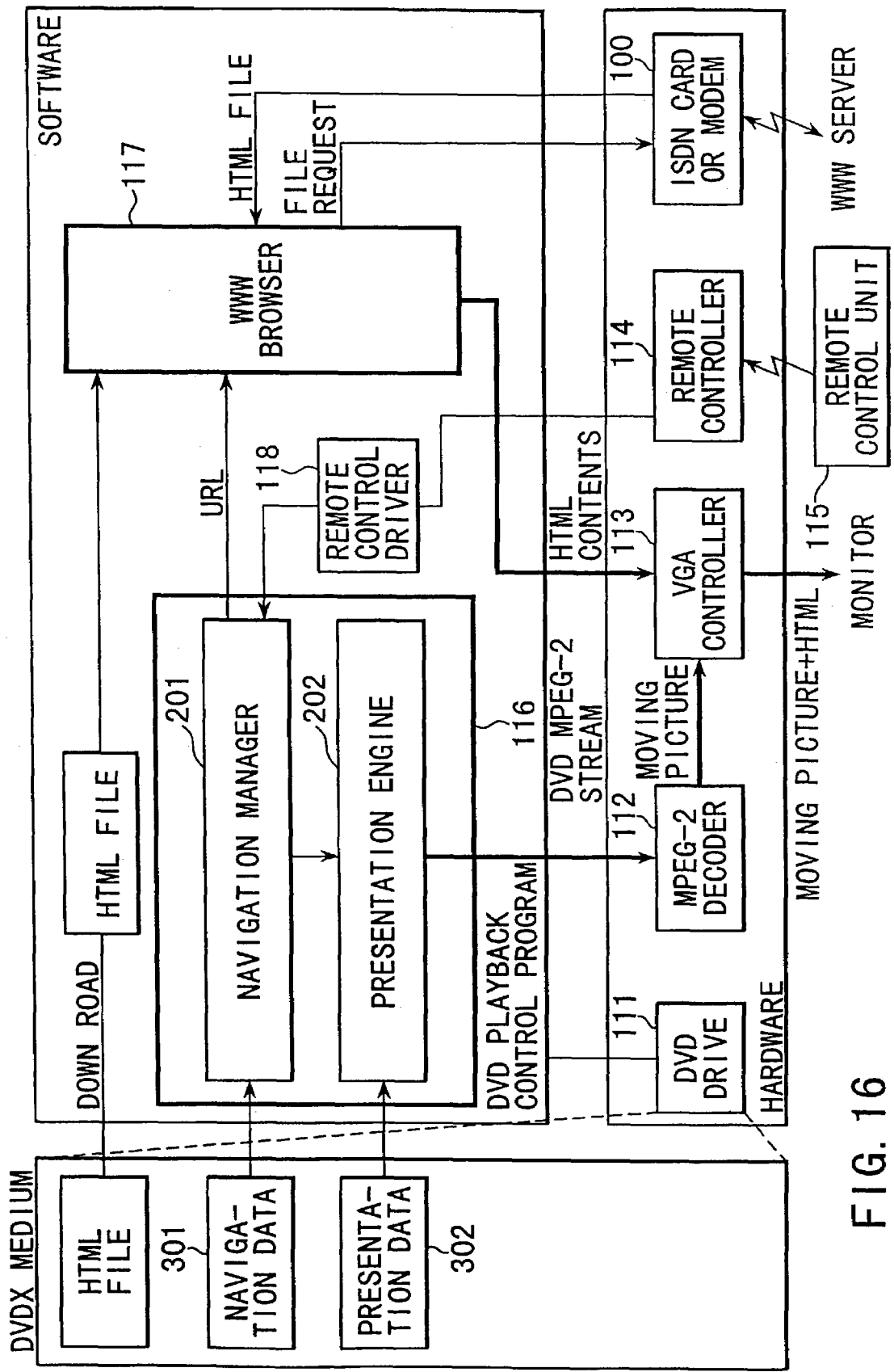
FIG. 16 is a block diagram of the basic configuration of the hardware and software of an image display apparatus according to a third embodiment of the present invention.

FIG. 16 shows the basic configuration of hardware and software for an image display apparatus according to a third embodiment of the present invention.

The image display apparatus is used as a digital video player, a set top box, or a personal computer and has the function of displaying computer graphics or moving pictures on a special display monitor or a home TV.

For the main hardware necessary to reproduce the DVD video information, the image display apparatus comprises a DVD drive 111 for reading the data recorded on a DVD medium, a MPEG-2 decoder 112 for decoding the DVD video information (video, subpicture, and audio) composed of MPEG-2 program streams read from the DVD drive 111, a VGA controller 113 for controlling a display monitor, a remote controller 114, and a communication unit (e.g., an ISDN card or a modem) 100 for connecting to the Internet.

In the DVD medium, not only navigation data constituting a DVD video title and presentation data 302 but also a HTML file for interlocking display with a DVD video are stored. The HTML file is used as an initial screen to explain, for example, the contents of the DVD video title and is downloaded onto the memory of the image display apparatus.

The title playback on the DVD-ROM medium is controlled by a DVD playback control program 116. The DVD playback control program 116 has the function of interfacing with a WWW browser 117 to display HTML contents on a screen, interlocking with the playback of DVD video.

The DVD playback control program 116 is actually composed of driver groups for controlling the aforementioned various pieces of hardware and application programs for making title playback using the driver groups. The function of the DVD playback control program 116 is classified into a navigation manager 201 and a presentation engine 202. The navigation manager 201 interprets the navigation data 301 and the instructions given by the user and determines how to reproduce the presentation data. The navigation manager 201 also has the function of taking address information, including URLs for referring to the locations-of the HTML contents to be displayed in an interlocking manner, out of the navigation data 301 and of reporting it to the WWW browser 117. URLs referring to the locations of HTML contents related to moving pictures are embedded in empty areas of navigation packs included in an MPEG-2 stream in video data units of one GOP or two GOPs (from 0.4 sec to 1 sec). Whether HTML contents are displayed in an interlocking manner is determined by an instruction given by the user. The instruction from the user is inputted to the navigation manager 201 via the remote control driver 118. The user may give an instruction to the navigation manager 201 by using the keyboard or mouse.

The presentation engine 202 effects the title playback of moving pictures according to the instruction given by the navigation manager 201.

The WWW browser 117 is a WWW client for communicating with an outside WWW server using the HTTP protocol. Receiving an HTML file from an outside WWW server via the communication unit 100, the WWW browser 117 displays it on a screen using a VGA controller 113.

In the system of FIG. 16, when the user has given an instruction to display HTML contents, the navigation manager 201 takes an URL referring to the location of the HTML contents related to the moving picture presently being reproduced out of the navigation data 301 and reports it to the WWW browser 117. As a result, the WWW browser 117 acquires the HTML contents specified by the URL and displays it together with the moving picture on the screen. In this case, when the URL has been embedded in empty areas of navigation packs as described earlier, this enables hypermedia information, including the corresponding HTML contents, to be acquired sequentially through the Internet and displayed for each moving picture corresponding to the scene being reproduced.

Furthermore, the URL referring to the HTML contents related to the moving picture corresponding to the scene being reproduced may be taken out of the navigation data 301 by expanding the navigation commands determined in the DVD video standard. A method of embedding the URLs will be explained in detail in FIG. 18 or later.

A concrete system configuration of the image processing apparatus according to the third embodiment will be explained.

Figure 17:
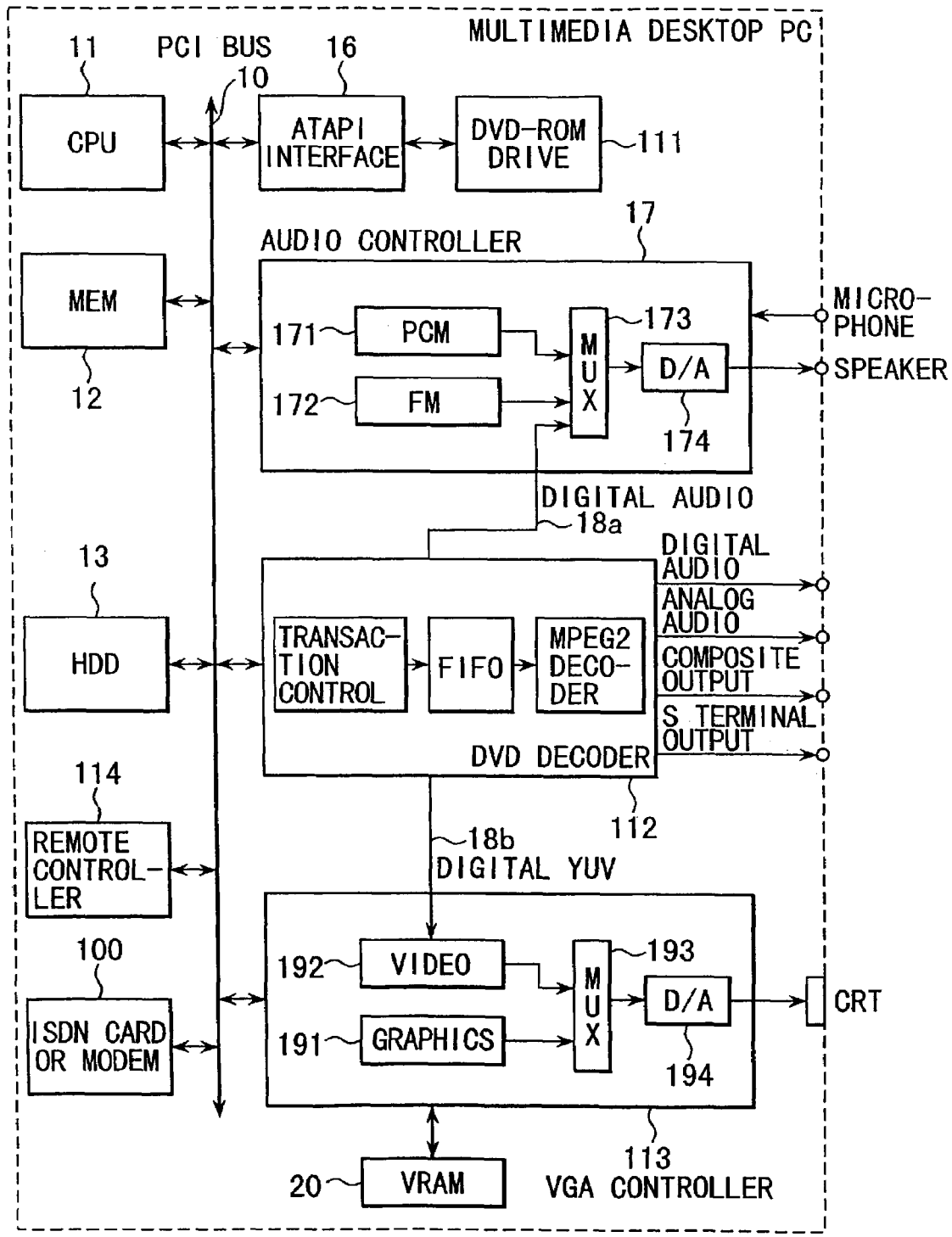
FIG. 17 is a block diagram of an example of a concrete hardware configuration of the image display apparatus according to the third embodiment.

As shown in FIG. 17, the system comprises a PCI bus 10, a CPU 11, a main memory (MEM) 12, an HDD 13, a DVD interface 16 composed of an ATAPI or SCSI interface, an audio controller 17, the DVD drive 111, the DVD decoder 112, the VGA controller 113, the remote controller 114, and the communication unit 100.

The DVD drive 111 reads the DVD video stream stored on a DVD medium at a transfer rate of 10.08 Mbps at its maximum. The DVD drive 111 is composed of a DVD medium, such as an optical disk, a motor, a pickup, a pickup drive, a servo controller, and a drive controller including an ECC circuit for detecting and correcting errors. The motor, pickup, pickup drive, servo controller, and drive controller function as a drive unit for driving a DVD medium and reading the data recorded on the DVD medium.

With the DVD medium, for example, about 135 minutes of a movie can be recorded on its one side. The main images (video), sub-images (sub-pictures) up to 32 channels, and sound up to 8 channels (audio) can be included in the presentation data constituting the movie information.

In the MPEG-2 standard, other coded data can be included in the data coded in MPEG-2. Those items of coded data are treated as a single MPEG-2 program stream.

MPEG-2 is used in encoding video information, run-length coding is used in encoding sub-pictures, and DOLBY AC3 is used in encoding audio information. In this case, too, the coded video, sub-pictures, and audio are treated as a single MPEG-2 program stream.

In the MPEG-2 standard, the encoding process is based on variable rate coding and therefore, the volume of data recorded or reproduced per unit time can be varied. As a result, a high-quality moving picture playback can be achieved by increasing the transfer rate of the MPEG streams constituting the corresponding frame groups as the scene is more violent.

Figure 18:
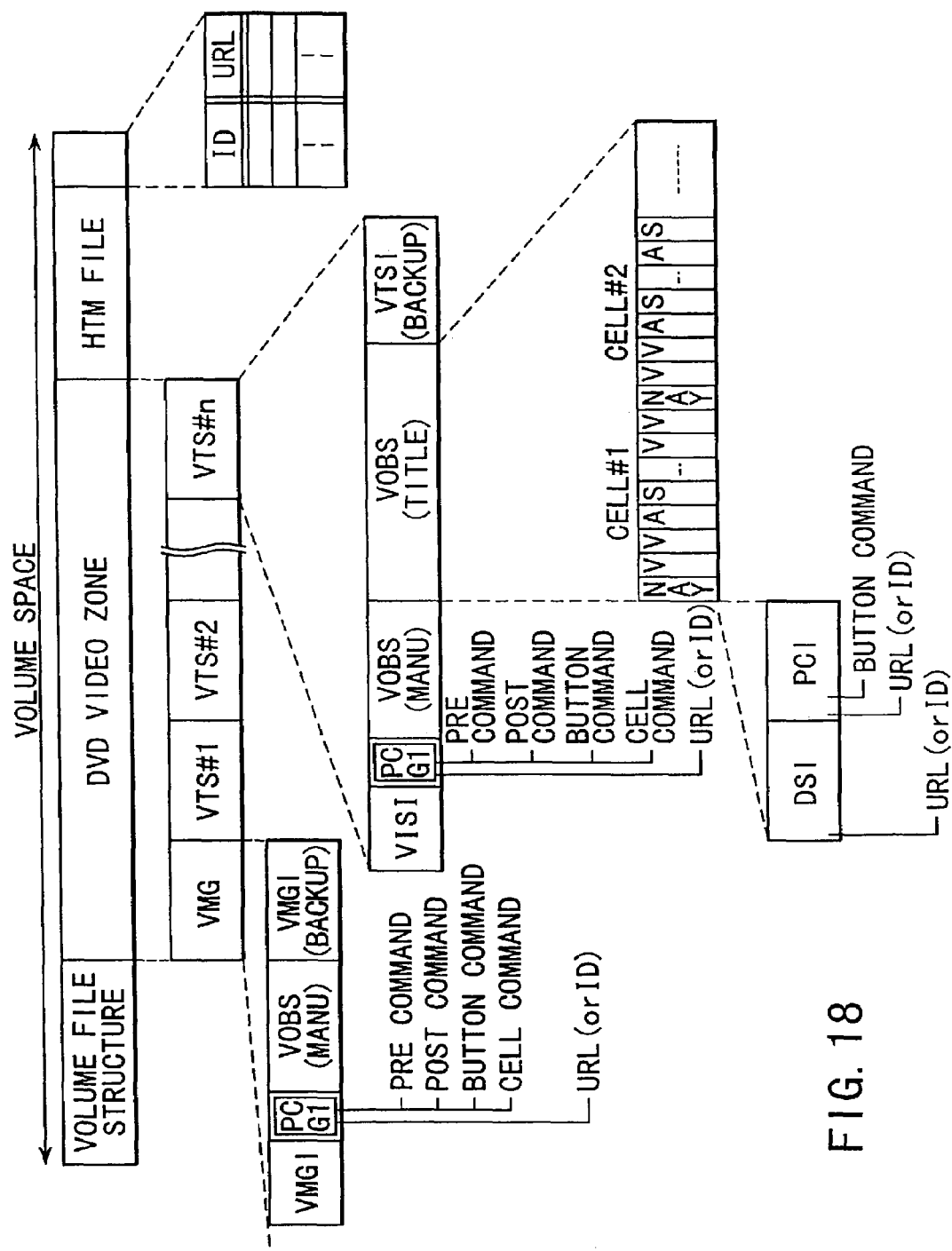
FIG. 18 shows the format of video data used in the image display apparatus of the third embodiment.

FIG. 18 shows an example of the recording format for DVD video information used in the third embodiment. The recording format conforms to the DVD video standard.

As shown in FIG. 18, the volume space of a DVD-ROM medium is composed of a volume film structure for managing volumes and files, a DVD video zone constituting DVD video information, and an area for files other than DVD video. In the other files area, HTML files, such as the initial screen file, have been stored.

The DVD video zone is composed of a video manager (VMG) and more than one DVD video title set (VTS#1 to VTS#n).

The VMG includes video manager information (VMGI), a menu video object set (VOBS), and backup video manger information (VMGI).

The VMGI is used as information on the contents of all the DVD video title sets present on a DVD medium and includes search information on each video title set (VTS) and parental attribute information. When the VMG includes menu video object sets (VOBS), the VMGI also includes program chain information (PGCI) as information to control the playback of the menu. The PGCI indicates the sequence for reproducing the cells constituting each menu video object (VOB). The title creator can embed the navigation commands (a pre-command, a post-command, a button command, or a cell command) in the VOB.

The precommand is a navigation command group to be executed before the start of the reproduction of cell groups (the cells in a PGC) whose reproduction sequence has been determined by the PGCI. The pre-command is used for initial setting before the reproduction of a PGC. The post-command is a navigation command group to be executed when all the cells in the PGC have been reproduced. The post-command is used for a branch process to a PGC to be reproduced next. The cell command is a navigation command group to be executed at the time when the corresponding cell in the PGC has been reproduced. The cell command is used to reproduce a specific cell repeatedly. The button command is a navigation command group to be executed at the time when the user has decided on a certain button, a choice item on the menu screen. The button command is used to execute menu items.

Each video title set (VTS) is composed of video title set information (VTSI), a menu video object set (VOBS), a video object set (VOBS) constituting a title, and a backup video title set information (VTSI). The VTSI is playback control information on the menu and title in the VTS and includes search information on the title and program chain information (PGCI) for managing the sequence for reproducing the cells in the menu and title. The PGCI also has the navigation command (a pre-command, a post-command, a button command, a cell command) embedded therein. In the PGCI in the VTS, URLs indicating the locations of HTML contents related to each scene in the title can be embedded.

The video object set (VOBS) constituting a title includes a large number of video objects called cells (cell #1, cell #2, . . . ). Each cell is composed of a large number of video object units, with a navigation pack (NAVI) at the head. That is, the video object units from one navigation pack to the next navigation pack constitute a single cell (or a video object). The navigation pack is included in video data units of one GOP or two GOPs (0.5 sec. to 1 sec). Each navigation pack is management information to control the reproduction of the corresponding video object and is composed of a disk search information (DSI) pack and presentation control information (PCI) pack. The DSI pack is used as search information for the reproduce start address in special playback, such as fast-forward or rewind. The PCI pack is used to change angles in multiangle playback or to display highlight information for executing a navigation command (e.g., a button command) according to the instruction given by the user. In the third embodiment, a URL indicating the HTML contents related to an image of the corresponding video object is embedded in an empty area of a DSI pack or PCI pack.

A single cell includes 15 frames of information necessary to reproduce a certain time of moving picture, for example, 0.5 sec to 1 sec of moving picture. One cell is constructed in GOPs (Group of Pictures) of an MPEG-2 program stream as described above. In each cell, a video pack (V), a sub-picture pack (S), and an audio pack (A) are recorded in multiplex form. The video pack (V), sub-picture pack (S), and audio pack (A) are data units of coded video, sub-picture, and audio, respectively. Although the data size of each pack is fixed, the number of packs included in one cell is variable. Therefore, the more violent scene a cell corresponds to, the more video packs the cell includes.

In the above format, the VMGI, VTSI, PGCI, PCI, and DSI constitute navigation data. The video pack, sub-picture pack, and audio pack for each menu and title constitute presentation data.

In the third embodiment, the button command in the navigation command embedded in the PGCI or PCI is used as a command to specify the URL embedded in the PGCI in the corresponding VTS or in the PGCI in the VMG. This makes it possible to display a button indicating a link with HTML contents on the moving picture screen. When the button has been selected, the corresponding HTML contents are externally acquired by the execution of the command and displayed on the screen.

The following is an explanation of each unit in the system of FIG. 17.

A CPU 11 controls the operation of the entire system. The CPU 11 executes an operating system and application programs to be executed that are stored in a system memory (MEM) 12. The playback of the. DVD video titles recorded on a DVD medium is started by causing the CPU 11 to execute a DVD playback control program 116.

A DVD interface 16 is a peripheral interface for connecting a peripheral unit, such as an HDD or a CD-ROM, to a PCI bus 10. In the third embodiment, the DVD interface 16 performs data transfer with a DVD drive 111.

An audio controller 17 provides input and output control of sound data under the control of the CPU 11. For sound output, the audio controller 17 includes a PCM sound source 171, an FM sound source 172, a multiplexer 173, and a D/A converter 174. The outputs of the PCM sound source 171 and FM sound source 172 and the digital audio data transferred from a DVD decoder 112 are inputted to the multiplexer 173, which selects one of them. The function corresponding to the D/A converter of the audio controller 17 is also provided for the DVD decoder 112. Therefore, the DVD decoder can output the analog audio signal directly without using the audio controller 17.

The digital audio data is obtained by decoding the audio data read from the DVD drive 111. The digital audio data is transferred from the DVD decoder 112 to the audio controller 17 through an audio bus 18a, not through a PCI bus 10. This enables the digital audio data to be transferred at high speeds without having an adverse effect on the performance of the computer system.

The DVD decoder 112 reads an MPEG-2 program stream via the memory 12 or directly from the DVD-ROM drive 111 and separates it into video packets, sub-picture packets, and audio packets. It thereafter decodes and synchronizes each of them and outputs the results. The DVD decoder 112 includes a transaction control section, an FIFO buffer, and an MPEG-2 decoder as shown in FIG. 17. The transaction control section causes the DVD decoder 112 to function as a bus master (or initiator) for issuing a transaction onto the PCI bus 10. It executes a bus cycle for reading an MPEG-2 program stream from the memory 12 or DVD-ROM drive 111. The MPEG-2 program stream is sent via the FIFO buffer to the MPEG-2 decoder, which separates the stream into video packets, sub-picture packets, and audio packets and decodes them.

The decoded audio data is transferred as digital audio data through the audio bus 18a to the audio controller 17 or directly to an external DSP. The decoded video and sub-pictures are combined. The resulting data is sent as-digital YUV data to the digital YUV input port of a VGA controller 113. In this case, the digital YUV data is transferred from the DVD decoder 112 to the VGA controller 113 through a video bus 18b, not through the PCI bus 10. This enables the digital YUV data to be transferred at high speeds without having an adverse effect on the performance of the computer system, as in the case of digital audio data.

For the video bus 18b, a VAFC complying with the VESA standard (VESA Advanced Feature Connector), VM-Channel (VESA Media Channel), S3 LBP interface, or ZV port may be used.

Under the control of the CPU 11, the VGA controller 113 controls a CRT display or an LCD used as a display monitor for the system. The VGA controller 113 supports moving pictures as well as text and graphic representation complying with the VGA specification. The VGA controller 113 includes a graphic display control circuit 191, a video display control circuit 192, a multiplexer 193, and a D/A converter 194.

The graphics display control circuit 191, which is a VGA-compatible graphics controller, converts the VGA graphic data on a video memory (VRAM) 20 into RGB video data. The video display control circuit 192 includes a video buffer that stores digital YUV data and a YUV-RGB conversion circuit that converts the YUV data stored in the buffer into RGB video data.

The multiplexer 193 selects one of the outputs from the graphics display control circuit 191 and video display control circuit 192 or superposes the DVD video from the video display control circuit 192 on the VGA graphics, such as the HTML contents, from the graphics display control circuit 191 and sends the resulting data to the LCD and D/A converter 194. The D/A converter 194 converts the video data from the multiplexer 194 into an analog RGB signal and outputs the signal to the CRT display.

The VGA controller 113 also has the function of converting the digital YUV data and audio data into a TV signal in the NTSC system and outputting the TV signal to the video input of an external TV set.

FIG. 19 shows an example of a display screen that links the DVD video with the HTML contents.

Figure 19A:
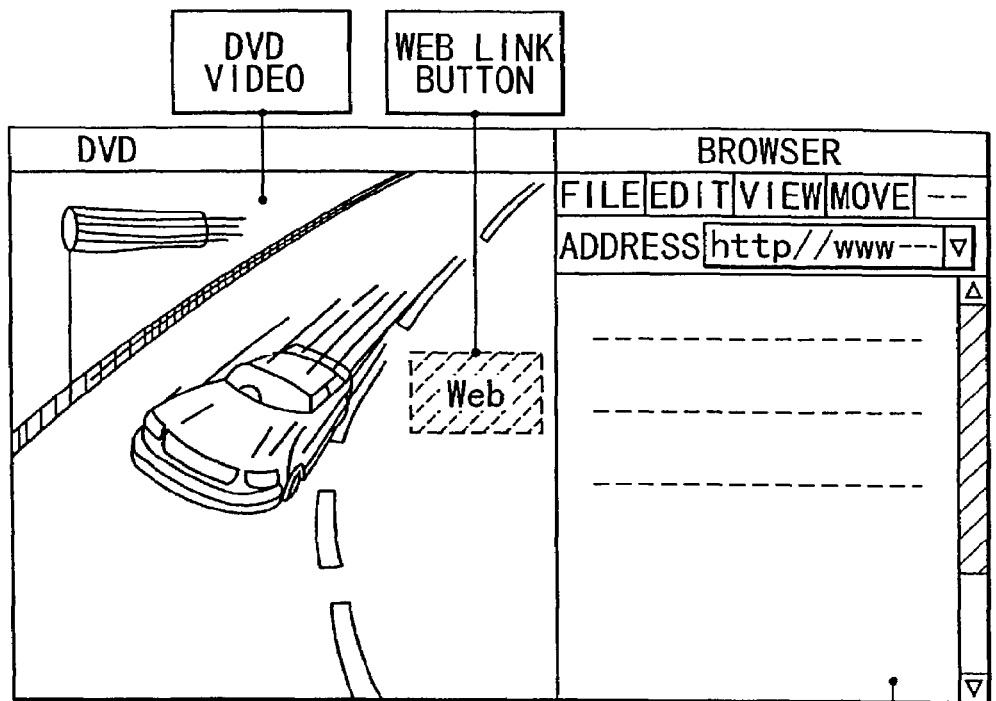
FIG. 19A shows an example of a display screen where DVD video is interlocked with HTML contents in the image display apparatus of the third embodiment.
Figure 19B:
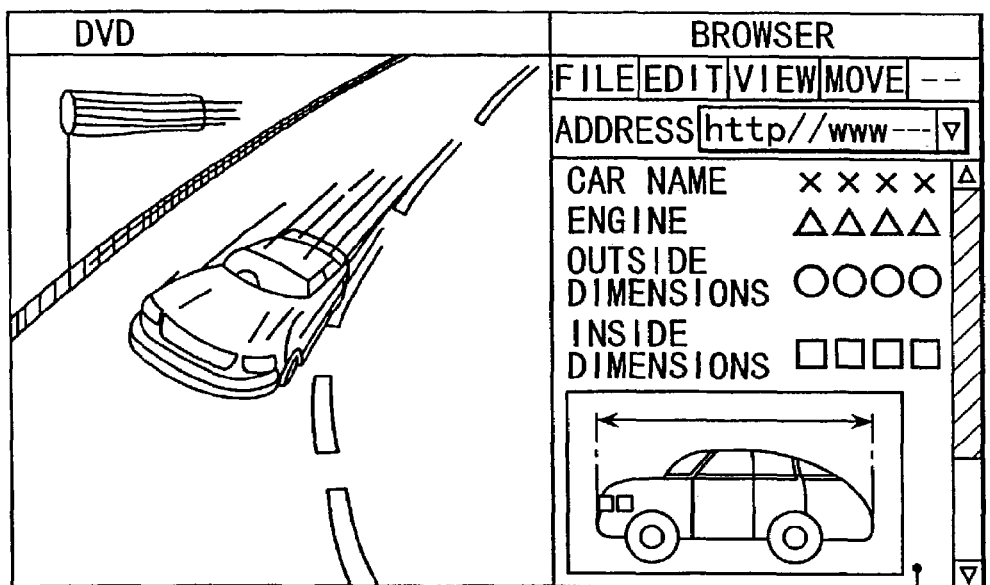
FIG. 19B shows an example of a display screen where DVD video is interlocked with HTML contents in the image display apparatus of the third embodiment.

As shown in FIG. 19A, the DVD video provided by the DVD playback control program 116 and the HTML contents provided by the WWW browser 117 are displayed simultaneously on the screen. In this state, for example, when the user presses a Web display key on a remote control unit to specify the interlocking display of HTML contents, or when the user selects a Web button displayed on a DVD video image with a remote control unit, a keyboard, or a mouse, the HTML contents related to the moving picture presently being reproduced are automatically acquired from an external WWW server and displayed on the screen as shown in FIG. 19B.

If the same HTML contents have been cached in a hard disk, the HTML contents will be displayed on the screen without accessing the WWW server. The WWW browser 117 need not be started beforehand. In this case, with the WWW browser 117 out of operation, only when the user specifies the interlocking display of HTML contents with the remote control unit, or only when the user selects the Web button displayed on the DVD video image, the HTML contents related to the moving picture presently being reproduced are acquired automatically from an external WWW server and displayed on the screen.

FIG. 19 shows a case where the image of the scene being reproduced by the DVD video includes a car. Interlocking with the image, the letters and images for the specifications for the car are displayed as HTML contents.

The following is an explanation of a method of displaying the DVD video and HTML contents in an interlocking manner.

First, a method of giving a URL to a video object complying with the DVD video standard and a reproducing method in connection with the method will be explained.

As explained in FIG. 18, in the DVD video standard, a video object is composed of a file group for video objects (or video data), management information on the data, and a control information file group for describing the playback sequence. The video object is an MPEG-2 program stream and has PCI and DSI, video data management information, as a sub-stream. A navigation pack including these is called a video object unit, which never fails to exist at the head of one GOP or two GOPs (0.5 sec to 1 sec) of video data. Therefore, embedding a URL in the reserve area for the PCI or DSI makes it possible to specify the Internet address to which the stream is related during the playback.

The following is an explanation of playback when the data is embedded.

Figure 20:
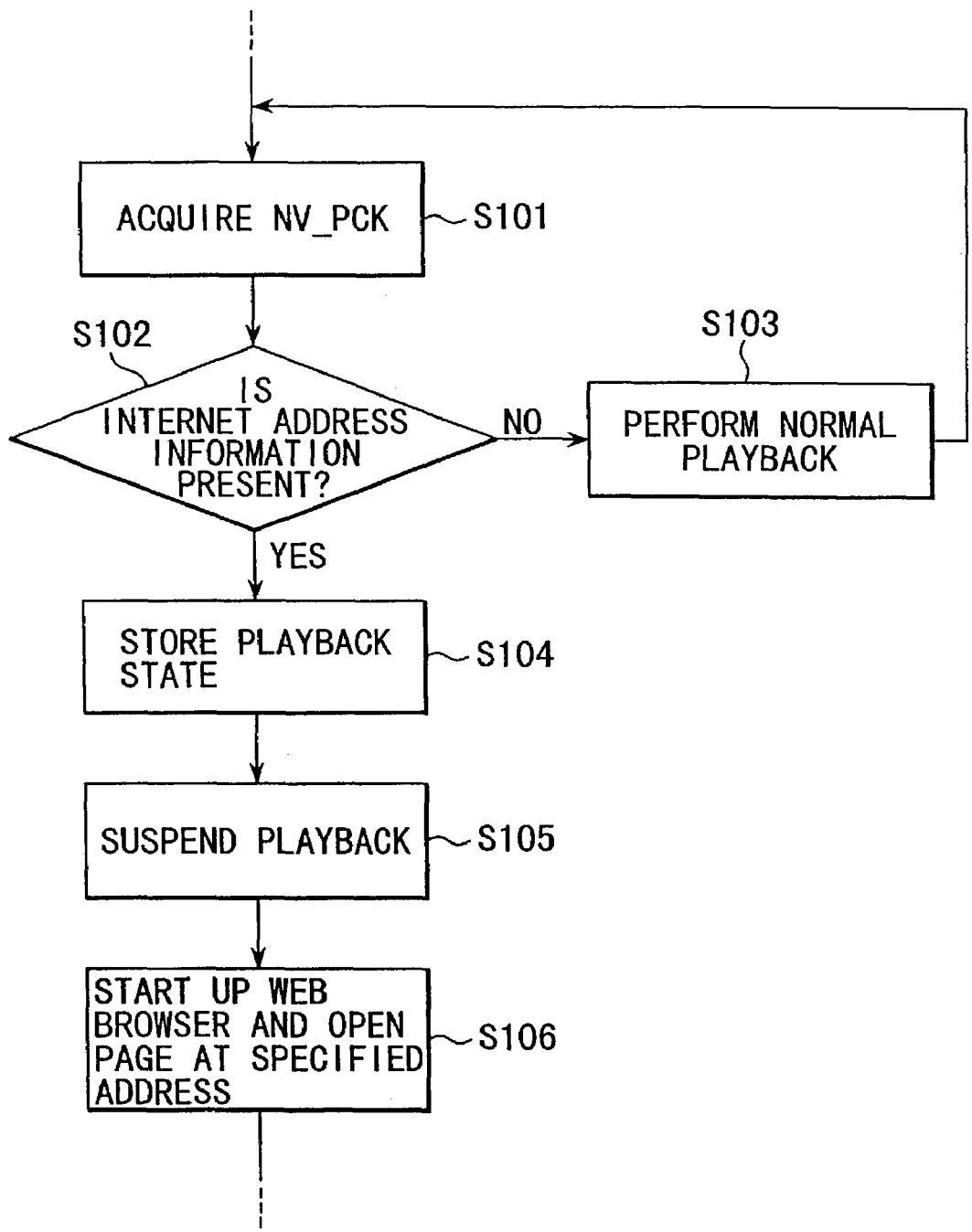
FIG. 20 is a flowchart of a first procedure for an interlocking display process applied to the image display apparatus of the third embodiment.

When the Web button is pressed during the playback of the DVD video, the related HTML contents are displayed in the sequence shown in the flowchart of FIG. 20.

Specifically, when the button is pressed, the DVD playback control program 116 acquires a navigation pack (NV_PCK) in the video object unit presently-being reproduced (step S101). Then, the DVD playback control program 116 judges whether an Internet address (URL) is present in the NV_PCK (step S102). If there is no Internet address, the playback is continued (step S103).

If an Internet address (URL) is included, the DVD playback control program 116 will store the position and state of the DVD video presently being reproduced and go into the pause (or halt) state (steps S104, S105). At the same time, the DVD playback control program 116 will use the Internet address as an argument to start the WWW browser 117 or hand over the information as an Internet address to be displayed on the WWW browser 117 in operation (step S106). When the WWW browser 117 is closed or when the user has specified the start of playback, or after a specific period of time has elapsed, the DVD playback control program 116 restarts the playback of the DVD video.

The reason why the playback of the DVD video is suspended is to prevent the contents of the DVD video from being missed. It is, of course, possible to display the browser while continuing the playback of the DVD video.

The following is an explanation of a reproducing method when an ID is given to a navigation pack of a video object complying with the DVD-VIDEO standard in place of the Internet address information (URL).

In this case, the URL corresponding to the ID is sensed by referring to a table that correlates the IDs and URLs previously downloaded into an external specific server, such as that in a provider(ISP), or into the image display apparatus. The correlating table may be provided in the DVD medium.

Figure 21:
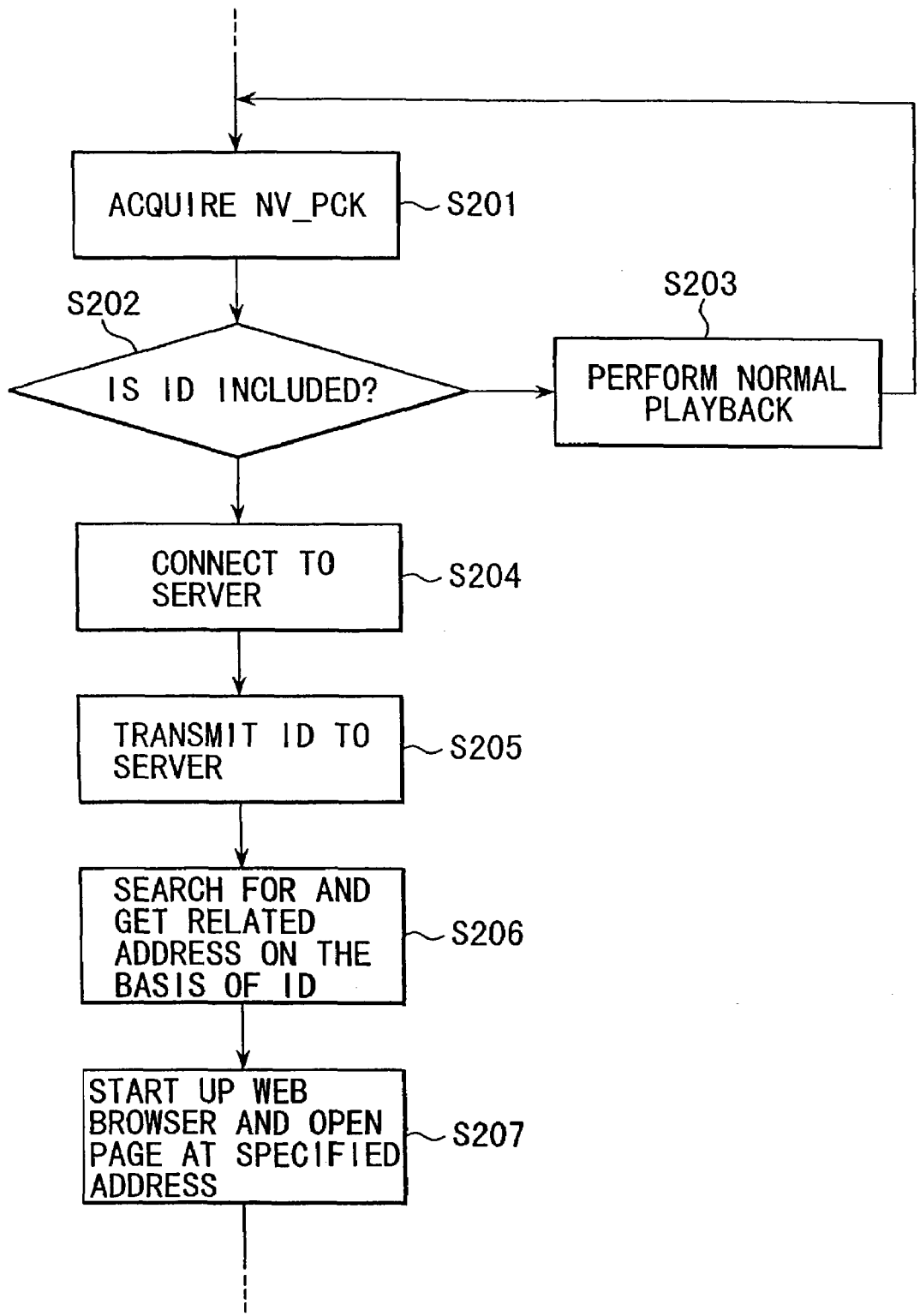
FIG. 21 is a flowchart of a second procedure for an interlocking display process applied to the image display apparatus of the third embodiment.

The processing after the Web button has been pressed is effected according to the flowchart of FIG. 21.

When the button has been pressed, the DVD playback control program 116 first acquires the navigation pack (NV_PCK) in the video object unit presently being reproduced (step S201) and checks whether the NV_PCK includes an ID (step S202). If there is no ID, the playback will be continued as usual (step S203).

If the NV_PCK includes an ID, the WWW browser 117 will be used to connect to a previously fixed external server, such as a provider, and the ID will be sent to the server (step S204). The server on the provider side has managed IDs and the Internet address-information (URLs) related to the IDs. It searches for the related Internet address on the basis of the ID and automatically acquires the related HTML file. It then sends the file to the WWW browser 117, which displays the HTML contents (steps S206, S207). When the table that correlates IDs with URLs has been downloaded into the image display apparatus, the DVD playback control program 116 acquires a URL from the correlating table and sends it to the WWW browser 117.

FIG. 22 shows examples of the table that correlates IDs with the Internet address information (URLS) related to the IDs.

In FIG. 22A, IDs are correlated with URLs in a one-to-one ratio. For example, for the ID TOKYO001, the URL "http://www.tokyo.co.jp/ . . . /tos001.htm" is searched for.

In FIG. 22B, more than one URL is correlated to each ID. For each ID, such a command as searches for an URL at the link destination according to conditions is used.

In the example of FIG. 22B, "If Today>981231 Jump 2" means that if Today (the numerical expression of today's date) is larger than 981231 (1998 Dec. 31), linking is done to "http:// . . . tos0002.htm"; otherwise linking is done to "http:// . . . /tos0001.htm." Jump 2 means referring to the second parameter.

Moreover, "If GPRMO>3 Jump 2" means that if the value of GPRM[0], one of the general parameters the DVD playback control program 116 or image display apparatus has, is larger than 3, linking is done to "http:// . . . tos0002.htm"; otherwise linking is done to "http:// . . . /tos0001.htm." Transmitting such a general parameter together with the ID enables a URL at the link destination to be changed according to the nation number registered with the image display apparatus or the parental level of the DVD video presently being reproduced.

With the reproducing method, when an ID has been acquired, the HTML contents to be read are searched for and start to be read in advance. This enables the page for the HTML contents to be displayed without delay. FIG. 22C shows an example of the table that correlates IDs with URLs. In FIG. 22C, the number of pages to be read in advance for each ID is paired with the corresponding URL and the pairs are managed.

For example, for ID=TOKYO001, "http:// . . . /tos0001.htm" has been registered as the URL for the HTML contents corresponding to the scene presently being reproduced. The number of HTML contents related to scenes to be reproduced is set at 3. Furthermore, "http:// . . . /tos0002.htm", "http:// . . . /tos0003.htm", "http:// . . . /tos0004.htm" have been registered as the URLs for the HTML contents, respectively.

FIG. 23 is a flowchart for the processing when the table of FIG. 22C is used.

Figure 23A:
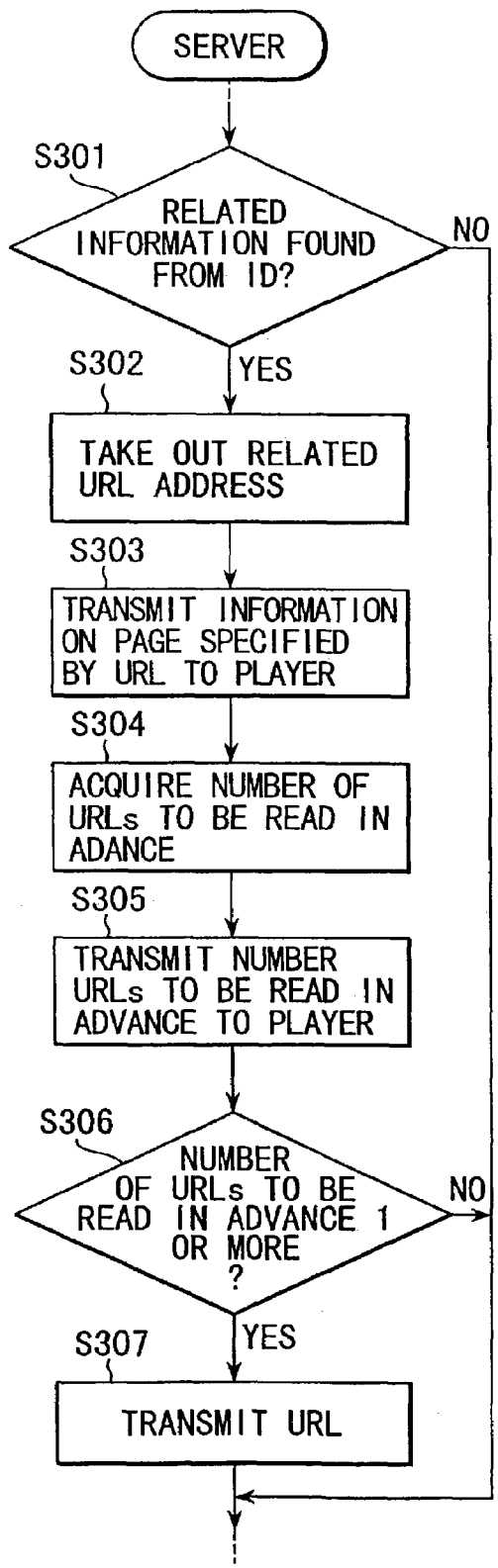
FIG. 23A is a flowchart of a third procedure (on the server side) for an interlocking display process applied to the image display apparatus of the third embodiment.
Figure 23B:
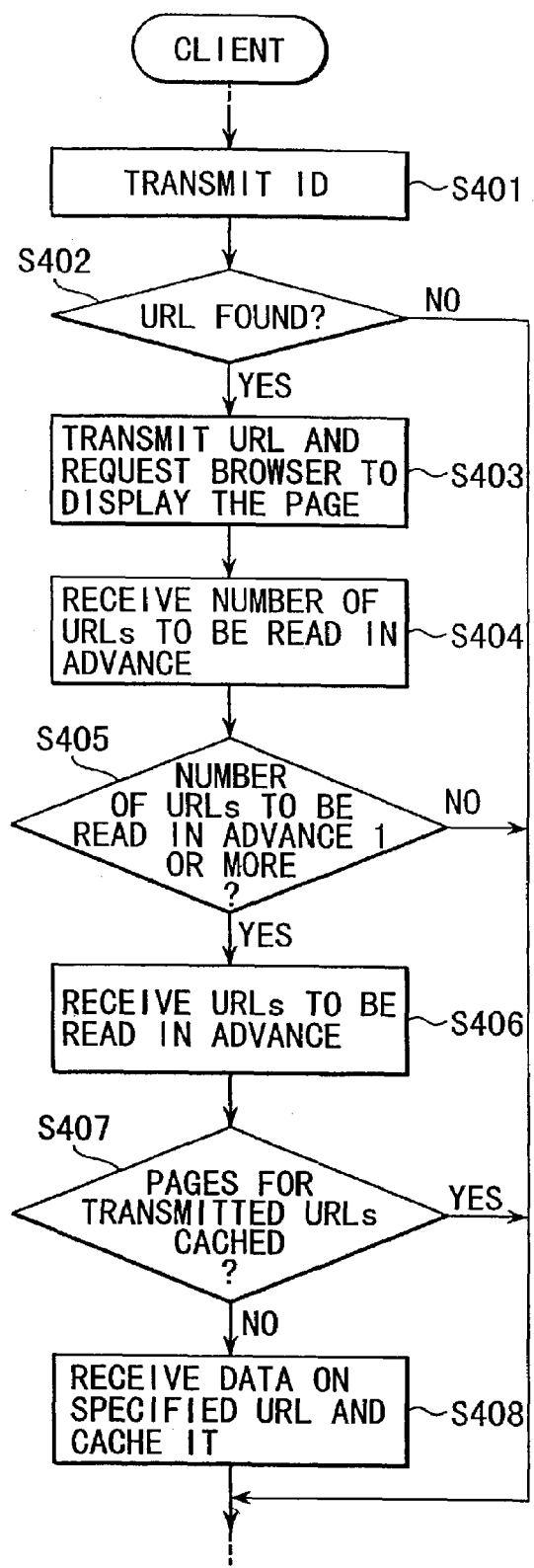
FIG. 23B is a flowchart of a third procedure (on the client side) for an interlocking display process applied to the image display apparatus of the third embodiment.

FIG. 23A shows the processing on the server side and FIG. 23B shows the processing on the image display apparatus side.

The DVD playback control program 116 first sends an ID (step S401). Receiving the ID, the server starts to search for related information on the basis of the ID, searches for the URL corresponding to the ID and the HTML file specified by the URL. If finding the HTML file, it will transmit the URL and HTML file as the related information corresponding to the ID to the image display apparatus (steps S301, S302, S303). Receiving the URL address, the DVD playback control program 116 requests the WWW browser 117 to display the HTML file specified by the URL address (steps S402, S403).

Then, the server gets the number of URL addresses to be read in advance, referring to the table and transmits it to the image display apparatus (step S305). Next, if the number is not zero, the server will transmit as many URL addresses as the number to the image display apparatus (step S305). The DVD playback control program 116 receives the number of URLs to be read in advance from the server. If the number is not zero, the DVD playback control program 116 will receive the URL addresses and check to see if the HTML files corresponding to the URLs have already been cached in the image display apparatus (steps S404 to 5407).

If they have already been cached in the image display apparatus, the DVD playback control program 116 will cause the WWW browser 117 to acquire the HTML files corresponding to the URLs from the server and cache them in the image display apparatus (step S408).

Such advance reading is not limited to the method of registering URLs to be read in advance in the table that correlates IDs with URLs. For instance, it may be realized by managing a table that correlates the URLs for the HTML files corresponding to the scene presently being reproduced with the URLs for the HTML files related to the scenes to be reproduced, in the server, the image display apparatus, or on the DVD medium. Moreover, a plurality of URLs including URLs to be read in advance may be registered in a navigation pack.

The following is an explanation of a method of linking to URLs using the button command.

In the DVD video standard, a button can be defined by writing in a PCI a rectangle to be highlighted and navigation commands to be executed when the rectangle is selected. The navigation commands do not include a command that links to a specified URL. When such a command is defined newly, it is possible to link to a certain URL when the button is selected. This enable a button (Web link button) for linking to a URL to be displayed on the DVD video screen. On the screen, when the user selects and decides on the button with the remote control unit, the HTML contents corresponding to the specified URL can be displayed.

Here, navigation commands in the DVD video standard will be explained briefly.

The navigation command can be used in four types of command areas: a pre-command area, a post-command area, a button command area, and a cell command area. The navigation command in each area is composed of a combination of one to three instructions. The instructions are roughly classified into the following six groups:

(1) Goto Instruction Group: More than one navigation command can be defined in the pre-command area or the post-command area. The Goto Instruction Group is used to change the order in which the navigation commands are executed. In the area to which the Goto Instruction Group belongs, the Goto Instruction Group specifies the number of the navigation command to be executed.

(2) Link Instruction Group: This instruction specifies transition in the present domain.

(3) Jump Instruction Group: This instruction specifies transition beyond the present domain.

(4) Compare Instruction Group: This instruction compares values and, if TRUE, will execute the next instruction and, if FALSE, will neglect the values.

(5) Set System Instruction Group: This instruction specifies the setting of navigation parameters.

(6) Set Instruction Group: This instruction is used to do specific calculations.

A combination of one or more instructions classified into six groups makes a command. There are 15 ways of combination.

The following methods can be considered to be examples of expansion of such navigation commands:

(Method 1)

Expansion of Existing Commands, such as Jump Command

Figure 24A:
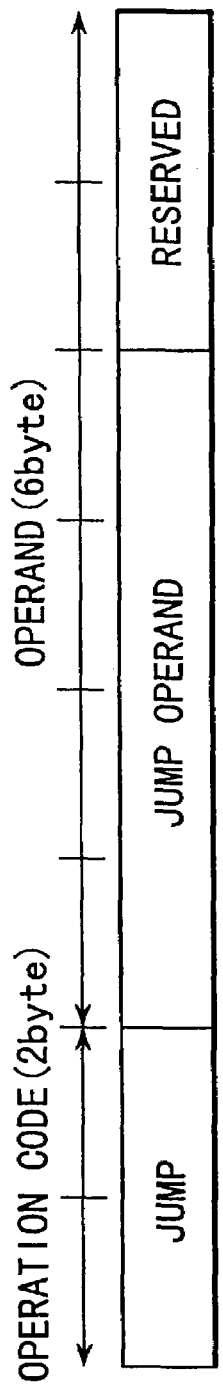
FIG. 24A is a drawing to help explain an example of expansion of a navigation command used in the image display apparatus of the third embodiment.
Figure 24B:
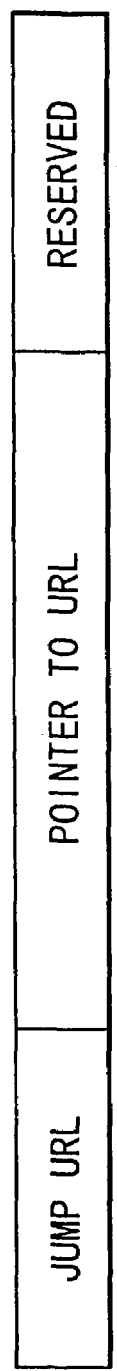
FIG. 24B is a drawing to help explain an example of expansion of a navigation command used in the image display apparatus of the third embodiment.

FIG. 24A shows a Jump command present in a navigation command in the DVD video standard. Control jumps to a title or a menu by specifying a Jump destination in a Jump operand. FIG. 24B also shows one of the Jump commands, Compare & Jump command, which is a command to jump if the comparison result has shown TRUE.

Figure 24C:
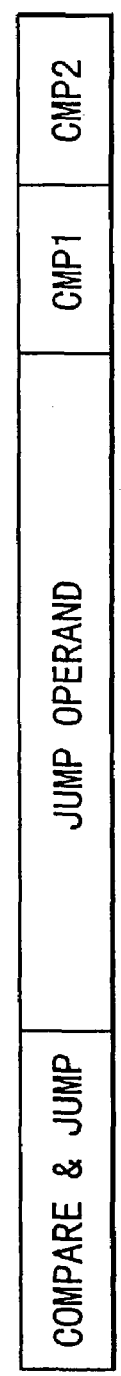
FIG. 24C is a drawing to help explain an example of expansion of a navigation command used in the image display apparatus of the third embodiment.
Figure 24D:
FIG. 24D is a drawing to help explain an example of expansion of a navigation command used in the image display apparatus of the third embodiment.

"Jump URL" command and "EQ & Jump URL" command are determined by expanding the Jump commands in FIGS. 24A and 24C as shown in FIGS. 24B and 24D.

The address at which the URL has been written is specified in the operand of the "Jump URL" command or "EQ & Jump URL" command. This enables linking to be done to the specified location when the button is pressed. Especially in the case of "EQ & Jump URL" command, the URL at the link destination can be changed dynamically, depending on the condition.

When the Web link button has been selected, the "Jump URL" command or "EQ & Jump URL" command are executed and the corresponding URL is acquired from PGCI and transferred to the WWW browser 117. This enables the HTML contents to be displayed.

(Method 2)

Method of Giving a Broad Interpretation of Information on PGC at the Link Destination by Use of Existing Commands Since there is a command which links with a PGC for managing the playback order of video objects and specifies the playback start position, use of the area in which a URL has been written as the link destination of the command enables the area to be regarded as a PGC. Namely, this method is a method of expanding the unit for managing the playback order so that the unit may make external connection information, not a video object. This makes it possible to connect with the outside world to display other information without expanding the existing format so much.

Figure 25A:
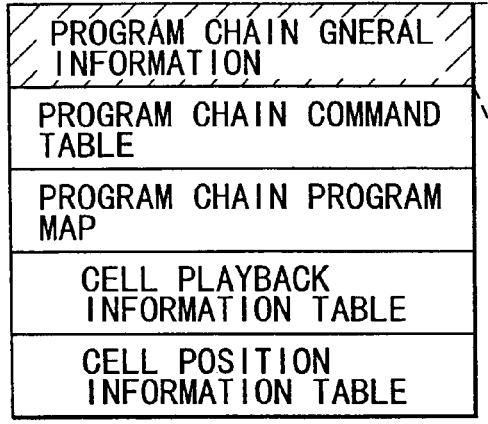
FIG. 25A is a diagram to help explain the structure of PGC and an example of expansion of a command linked with the structure used in the image display apparatus of the third embodiment.
Figure 25B:
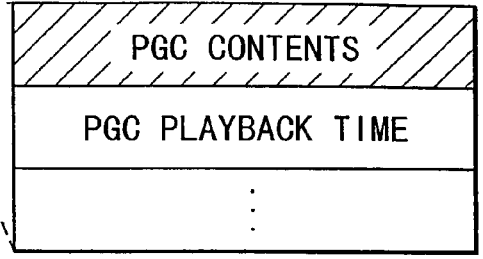
FIG. 25B is a diagram to help explain the structure of PGC and an example of expansion of a command linked with the structure used in the image display apparatus of the third embodiment.
Figure 25C:
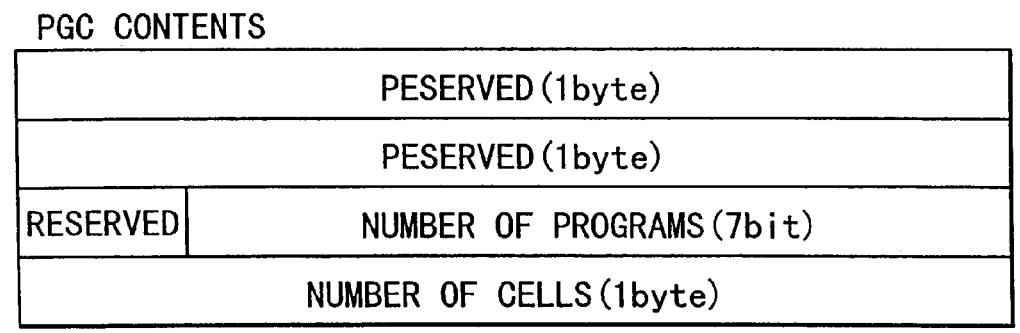
FIG. 25C is a diagram to help explain the structure of PGC and an example of expansion of a command linked with the structure used in the image display apparatus of the third embodiment.
Figure 25D:
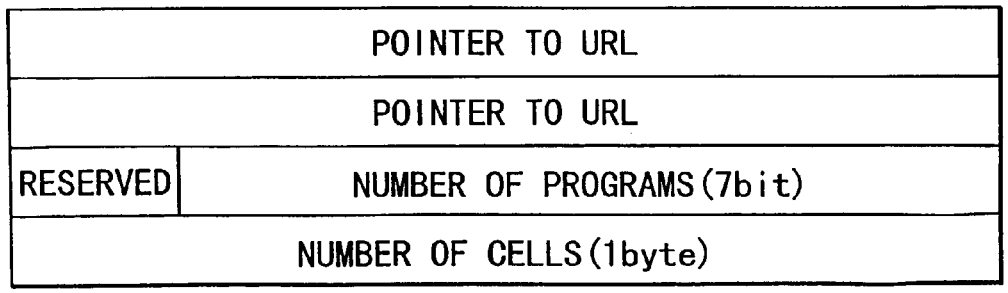
FIG. 25D is a diagram to help explain the structure of PGC and an example of expansion of a command linked with the structure used in the image display apparatus of the third embodiment.

FIG. 25A shows the structure of a PGC. FIG. 25B shows the structure of Program Chain General Information. FIG. 25C shows the structure of the PGC Contents of FIG. 25B. Since there are two bytes of reserved areas, pointers indicating the locations in which URLs have been written are written as shown in FIG. 25D.

This makes it possible to take out the URL and acquire the HTML file corresponding to the URL from the server and display the file, when a link command to the PGC is executed.

(Method 3)

A Method of Storing a URL Table File Together with DVD Video in a DVD Medium and Referring to the URL Table Downloaded into the Image Display Apparatus when a Nop Command is Executed The navigation commands in the DVD video standard include the Nop command, which does nothing. When the Nop command has been embedded, the command is determined to be a link button to a URL. Each time the button is pressed, URLs are acquired one by one from the URL table and the HTML file corresponding to the URL is acquired from the server and displayed.

(Method 4)

A Method of Allowing the Reproducing Side to Ignore all the Button Commands and Refer to a Table The method 4 is a modification of the method 3. All the commands are regarded as having the possibility of linking with URLs and the URL table is referred to. Then, a URL is taken out of the URL table.

The following is an explanation of a method of reproducing the DVD video from an HTML file.

The playback at the specified position on the DVD video can be effected by navigation commands. Therefore, scripting the navigation commands enables the DVD video to be reproduced directly from the HTML.

For a script in the HTML, the following is written when a certain button has been pressed: <CallSSFPPGC> (meaning that when a medium is loaded, call a PGC to be reproduced first (FPPGC) and reproduce it). This enables the playback to be resumed as playback is effected when a DVD medium is inserted. Specifically, in the method, the playback of a DVD medium is controlled on the basis of the displayed HTML file and a tug specifying the playback start position of DVD video is embedded in the HTML script. The method also enables interlocking display of DVD video and HTML contents.

While in the embodiments, the case where HTML contents are acquired from an external server has been explained, a plurality of HTML contents may be stored in a DVD media beforehand and the contents be displayed, interlocking with the playback of the DVD video. The function of a WWW browser may be incorporated in the DVD playback control program 116.

Instead of the user requesting the display of HTML contents one by one by pressing buttons, all the HTML contents may be displayed automatically, interlocking with the playback of the DVD video.

As described above, with the present invention, DVD video titles can be combined with the Internet by only making effective use of and simple expansion of the DVD video standard, without changing the standard. This helps realize a new service in which DVD video titles are combined with hypermedia contents, such as HTML files provided by the Internet. Especially when the method of embedding URLs in navigation packs periodically included in a DVD video stream is used, this saves the trouble of searching for URLS, which improves the performance of real-time display of HTML contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A reproduction method implemented on a reproduction system having a capability of being connected to a network, the method comprising:

retrieving a stream data block that contains both a moving picture and access information indicative of a location on the network of external information related to the moving picture, wherein the access information is embedded in an empty area in the stream data block and the empty area is in a navigation pack according to DVD standards in the stream data block;

reproducing the stream data block to display the moving picture on a screen;

accepting a user instruction during a period of displaying the moving picture; and issuing an access to the location on the network to request the external information in response to the user instruction.

2. The method according to claim 1, further comprising:

displaying a mark together with the moving picture on the screen, wherein the user instruction is accepted through the mark.

3. The method according to claim 1, wherein the access information indicates a first location of first external information related to a first stream data block, and indicates a second location of second external information related to a second stream data block.

4. The method according to claim 3, further comprising:

accepting a first instruction during a period of displaying a moving picture reproduced from the first stream data block;

issuing a first access to the first location of first external information to request the first external information in response to the first user instruction;

accepting a second instruction following the first instruction during a period of displaying a moving picture reproduced from the second stream data block; and issuing a second access to the second location of second external information to request the second external information in response to the second user instruction.

5. The method according to claim 1, further comprising:
outputting the external information on the screen while pausing the display of the moving picture.

6. The method according to claim 1, further comprising:
outputting the external information together with the moving picture on the screen.

7. A reproduction apparatus having a capability of being connected to a network, comprising:
a stream retriever configured to retrieve a stream data block that contains both a moving picture and access information indicative of a location on the network of external information related to the moving picture, wherein the access information is embedded in an empty area in the stream data block and the empty area is in a navigation pack according to DVD standards in the stream data block;
a reproducer configured to reproduce the stream data block to display the moving picture on a screen;
a user interface configured to accept a user instruction during a period of displaying the moving picture; and
an access processor configured to access the location on the network to request the external information in response to the user instruction.

8. The apparatus according to claim 7, wherein the user interface causes the screen to display a mark together with the moving picture, wherein the interface accepts the user instruction through the mark.

9. The apparatus according to claim 7, wherein the access information indicates a first location on the network of first external information related to a first stream data block, and indicates a second location of second external information related to a second stream data block.

10. The apparatus according to claim 7, further comprising:
a first output controller configured to control the screen to output the external information while controlling the screen to pause the displaying of the moving picture.

11. The apparatus according to claim 7, further comprising:
a second output controller configured to control the screen to output the external information together with the moving picture.

* * * * *